(12) United States Patent
Park et al.

(10) Patent No.: US 11,630,546 B2
(45) Date of Patent: Apr. 18, 2023

(54) DISPLAY DEVICE

(71) Applicant: SAMSUNG DISPLAY CO., LTD., Yongin-si (KR)

(72) Inventors: Sanghun Park, Cheonan-si (KR); Soowon Kim, Cheonan-si (KR); Jihoon Kim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/816,716

(22) Filed: Aug. 1, 2022

(65) Prior Publication Data

US 2022/0374102 A1 Nov. 24, 2022

Related U.S. Application Data

(62) Division of application No. 17/194,724, filed on Mar. 8, 2021, now Pat. No. 11,416,107.

(30) Foreign Application Priority Data

Mar. 10, 2020 (KR) .......................... 10-2020-0029822
Dec. 23, 2020 (KR) .......................... 10-2020-0181964

(51) Int. Cl.
  *G06F 3/044* (2006.01)
  *G06F 3/041* (2006.01)

(52) U.S. Cl.
  CPC .......... *G06F 3/0446* (2019.05); *G06F 3/0412* (2013.01); *G06F 3/0443* (2019.05); *G06F 3/04164* (2019.05); *G06F 2203/04111* (2013.01)

(58) Field of Classification Search
  CPC .. G06F 3/0446; G06F 3/04164; G06F 3/0443; G06F 3/0412; G06F 2203/04111
  See application file for complete search history.

(56) References Cited

U.S. PATENT DOCUMENTS 5,856,812 A * 1/1999 Hush ..................... H01J 31/127
                                                          345/77
9,791,986 B2   10/2017 Ouh et al.
(Continued)

FOREIGN PATENT DOCUMENTS

JP       H09246516 A  *  9/1997
KR    20060087416 A  *  8/2006
(Continued)

*Primary Examiner* — Ricardo Osorio
(74) *Attorney, Agent, or Firm* — Lewis Roca Rothgerber Christie LLP

(57) ABSTRACT

A display device, includes: a base substrate; a display element layer on the base substrate, the display element layer including a driving electrode; an insulation layer on the display element layer, the insulation layer defining an active region and a peripheral region adjacent to the active region; an input sensing layer on the insulation layer, the input sensing layer including a sensing electrode that overlaps the active region and a compensation electrode that overlaps the peripheral region, the sensing electrode and the driving electrode forming a parasitic capacitor; and a detection control circuit electrically connected through an output node to the sensing electrode and the compensation electrode, wherein the detection control circuit is configured to control a capacitance of the parasitic capacitor using a first offset capacitor, the first offset capacitor being formed by the compensation electrode.

11 Claims, 13 Drawing Sheets

(56) References Cited

U.S. PATENT DOCUMENTS

| 10,627,972 | B2 | 4/2020 | Chen et al. |
| 10,788,380 | B2 | 9/2020 | Feng et al. |
| 2017/0185218 | A1 | 6/2017 | Lee et al. |

FOREIGN PATENT DOCUMENTS

| KR | 10-2015-0109890 A | 10/2015 |
| KR | 10-2016-0040944 A | 4/2016 |
| KR | 10-2017-0078494 A | 7/2017 |
| WO | WO 2018/211760 A1 | 11/2018 |

* cited by examiner

DISPLAY DEVICE

CROSS-REFERENCE TO RELATED APPLICATIONS

This application is a divisional of U.S. patent application Ser. No. 17/194,724, filed Mar. 8, 2021, which claims priority to and the benefit of Korean Patent Application Nos. 10-2020-0029822, filed Mar. 10, 2020 and 10-2020-0181964, filed Dec. 23, 2020, the entire content of all of which is incorporated herein by reference.

BACKGROUND

Aspects of some embodiments of the present invention relate to a display device with an improved touch performance.

There have been developed a variety of display devices used for multimedia apparatuses such as televisions, mobile phones, tablet computers, navigation systems, and game consoles. A display device may include, for example, a window and a display module that displays images and detects external inputs. The display module may include a display panel that displays images and an input sensing layer that detects external inputs.

Recently input sensing layers have been utilized in capacitance sensing method. In the capacitance method, when an object such as a finger touches a window, a variation in capacitance between sensing electrodes may be used to determine or detect the occurrence of touch. Because the capacitance method senses a size of the capacitance between the touching object and the sensing electrode of the input sensing layer, it may be desirable to obtain a stable output from various noises.

The above information disclosed in this Background section is only for enhancement of understanding of the background and therefore the information discussed in this Background section does not necessarily constitute prior art.

SUMMARY

Aspects of some embodiments of the present invention include a display device with an improved touch performance.

According to some embodiments of the present inventive concepts, a display device may comprise: a base substrate; a display element layer on the base substrate, the display element layer including a driving electrode; an insulation layer on the display element layer, the insulation layer defining an active region and a peripheral region adjacent to the active region; an input sensing layer on the insulation layer, the input sensing layer including a sensing electrode that overlaps the active region and a compensation electrode that overlaps the peripheral region, the sensing electrode and the driving electrode forming a parasitic capacitor; and a detection control circuit electrically connected through an output node to the sensing electrode and the compensation electrode. The detection control circuit may control capacitance of the parasitic capacitor using a first offset capacitor. The first offset capacitor may be formed by the compensation electrode.

According to some embodiments, the compensation electrode may include a first compensation electrode and a second compensation electrode that are located at different levels from each other. The first and second compensation electrodes may form the first offset capacitor.

According to some embodiments, the input sensing layer may include: a first insulation layer on the insulation layer; a first conductive layer on the first insulation layer on which the first compensation electrode is located; a second insulation layer on the first conductive layer; and a second conductive layer on the second insulation layer on which the second compensation electrode is located.

According to some embodiments, the sensing electrode may include a first sensing electrode and a second sensing electrode that are spaced apart from each other when viewed in plan. The first and the second sensing electrodes may form a mutual capacitor. The detection control circuit may output a detection signal and a compensation signal to the first sensing electrode and the first compensation electrode, respectively. The compensation signal may have a phase that is inverted to a phase of the detection signal.

According to some embodiments, the detection control circuit may include: a voltage converter outputs a detection voltage by sensing a detection signal that is output from the second sensing electrode to the output node and by sensing an offset detection signal that is output from the second compensation electrode to the output node; and an offset controller that includes a second offset capacitor connected to the output node.

According to some embodiments, capacitance of the second offset capacitor may be less than the capacitance of the first offset capacitor.

According to some embodiments, the second offset capacitor may include: a third compensation electrode that receives an offset signal corresponding to the compensation signal; and a fourth compensation electrode connected to the output node.

According to some embodiments, the offset controller may further include a switch between the third compensation electrode and the output node.

According to some embodiments, the second offset capacitor may include a plurality of auxiliary capacitors that are electrically connected to the output node and are connected in parallel to each other.

According to some embodiments of the present inventive concepts, a display device may include: a base substrate that defines an active area and a peripheral area adjacent to the active area; a circuit element layer on the base substrate, the circuit element layer including a constant-current circuit; a display element layer on the circuit element layer, the display element layer including a driving electrode; an input sensing layer on the display element layer, the input sensing layer including a sensing electrode that overlaps the active area, the sensing electrode and the driving electrode forming a parasitic capacitor; and a detection control circuit electrically connected to the sensing electrode and the constant-current circuit. The detection control circuit may control the constant-current circuit to remove at least a portion of a component caused by capacitance of the parasitic capacitor from a signal that is input from the sensing electrode.

According to some embodiments, the constant-current circuit may be on the peripheral area.

According to some embodiments, the constant-current circuit may include a first transistor including a first gate, a first source, and a first drain. The detection control circuit may include a first terminal electrically connected to the first gate, a second terminal electrically connected to the first source, and a third terminal electrically connected to the first drain.

According to some embodiments, the second terminal may provide the constant-current circuit with the signal.

According to some embodiments, the detection control circuit provides the first terminal with a control voltage to control on-off of the first transistor.

According to some embodiments, the control voltage may be provided in a pulse width modulation manner.

According to some embodiments, the detection control circuit may further include a ground electrode. The third terminal may be electrically connected to the ground electrode.

According to some embodiments, the display element layer may further include a power line to which a power voltage is provided. The third terminal may be electrically connected to the power line.

According to some embodiments, the constant-current circuit may further include a second transistor including a second gate, a second source, and a second drain. The detection control circuit may further include a fourth terminal electrically connected to the second gate.

According to some embodiments, the second source may be electrically connected to the second terminal. The second drain may be electrically connected to the third terminal.

According to some embodiments, the detection control circuit may provide the fourth terminal with a control voltage to control on-off of the second transistor.

DETAILED DESCRIPTION OF EMBODIMENTS

Figure 1:
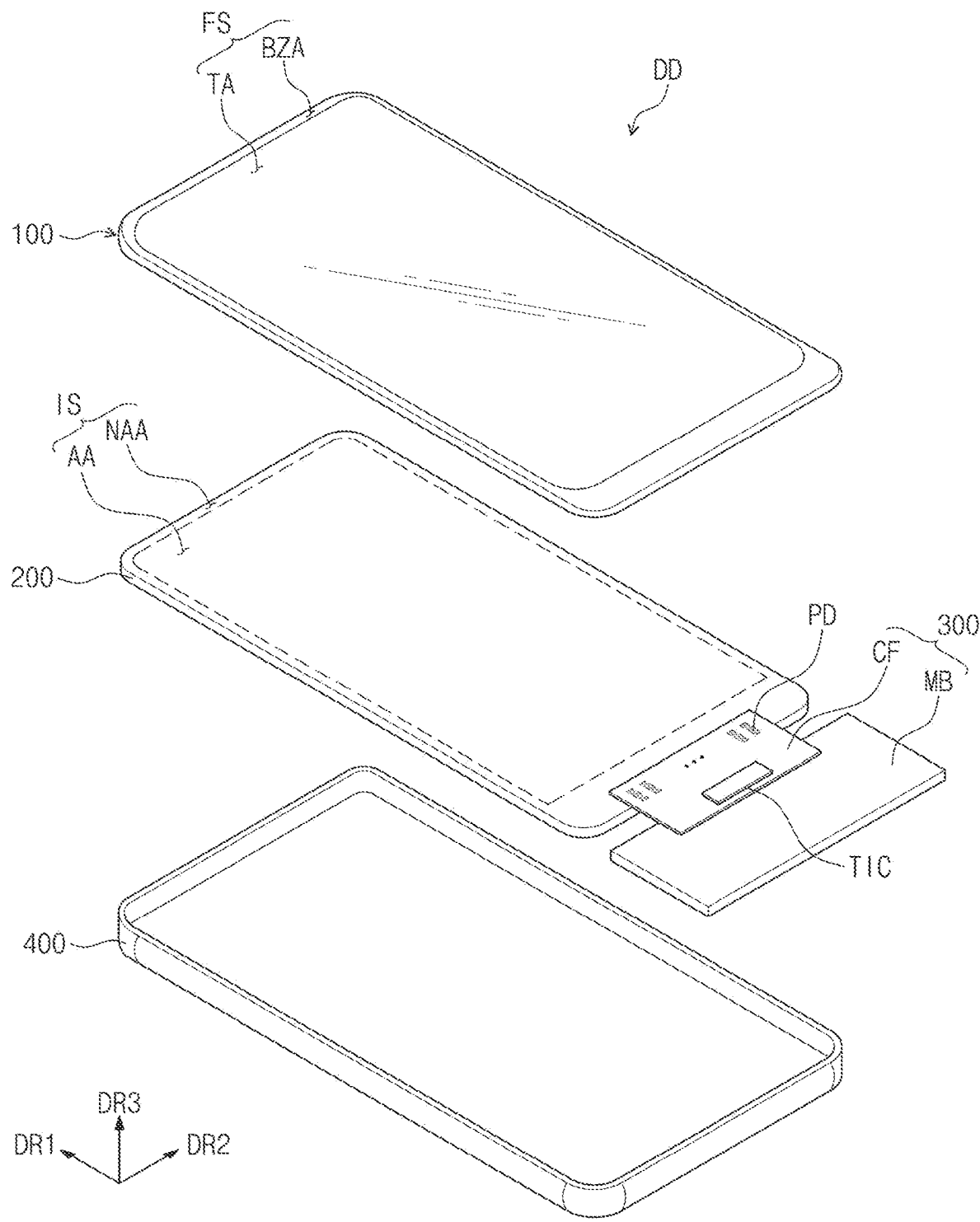
FIG. 1 illustrates an exploded perspective view showing a display device according to some embodiments of the present invention.

In this description, when a certain component (or region, layer, portion, etc.) is referred to as being "on", "connected to", or "coupled to" other component(s), the certain component may be directly located on, directly connected to, or directly coupled to the other component(s) or at least one intervening component may be present therebetween.

Like numerals indicate like components. Moreover, in the drawings, thicknesses, ratios, and dimensions of components are exaggerated for effectively explaining the technical contents.

The term "and/or" includes one or more combinations defined by associated components.

It will be understood that, although the terms first, second, etc. may be used herein to describe various components, these components should not be limited by these terms. These terms are only used to distinguish one component from another component. For example, a first component could be termed a second component, and vice versa without departing from the scope of the present invention. Unless the context clearly indicates otherwise, the singular forms are intended to include the plural forms as well.

In addition, the terms "beneath", "lower", "above", "upper", and the like are used herein to describe one component's relationship to other component(s) illustrated in the drawings. The relative terms are intended to encompass different orientations in addition to the orientation depicted in the drawings.

Unless otherwise defined, all terms used herein including technical and scientific terms have the same meaning generally understood by one of ordinary skilled in the art. Also, terms as defined in dictionaries generally used should be understood as having meaning identical or meaning contextually defined in the art and should not be understood as ideally or excessively formal meaning unless definitely defined herein.

It should be understood that the terms "comprise", "include", "have", and the like are used to specify the presence of stated features, integers, steps, operations, components, elements, or combinations thereof, but do not preclude the presence or addition of one or more other features, integers, steps, operations, components, elements, or combinations thereof.

The following will now describe aspects of some embodiments of the present invention in conjunction with the accompanying drawings.

Figure 2:
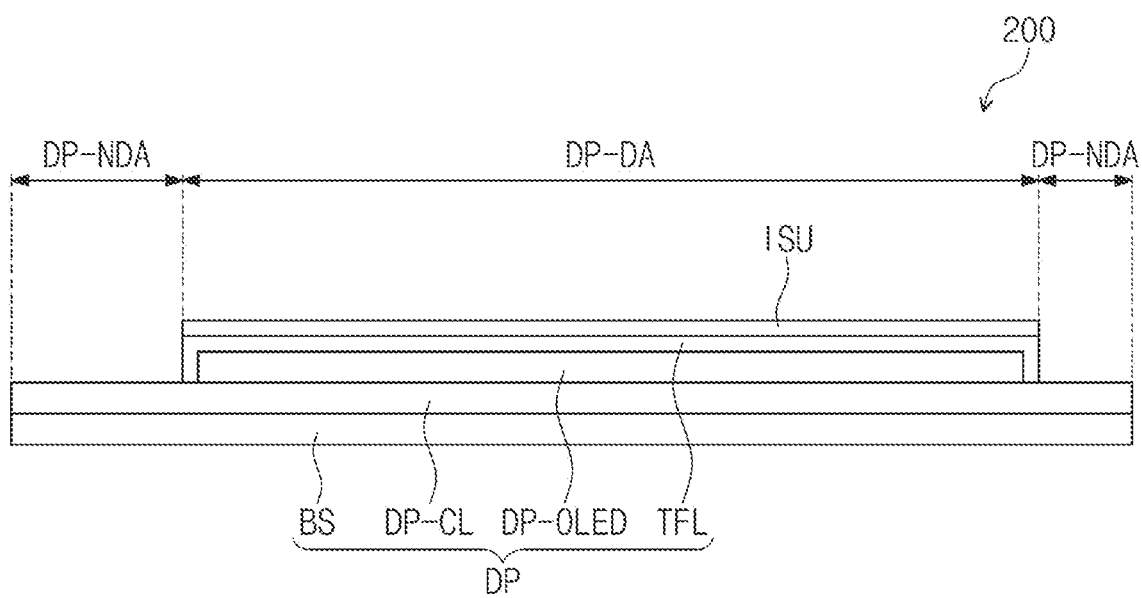
FIG. 2 illustrates a cross-sectional view showing a display module according to some embodiments of the present invention.

FIG. 1 illustrates an exploded perspective view showing a display device according to some embodiments of the present invention. FIG. 2 illustrates a cross-sectional view showing a display module according to an embodiment of the present invention.

A display device DD may be an apparatus that is activated by electrical signals. The display device DD may include various embodiments or may operate as various different electrical devices. For example, the display device DD may include a tablet computer, a laptop computer, a desktop computer, or a smart television set. According to some embodiments, as illustrated, for example, in FIG. 1, the display device DD may be a smart phone.

Referring to FIG. 1, the display device DD may display an image on a front surface FS. The front surface FS includes a transmission area TA and a bezel area BZA adjacent to (e.g., around a periphery or outside a footprint of) the transmission area TA.

The front surface FS may be defined parallel to a plane formed by a first direction DR1 and a second direction DR2. A third direction DR3 indicates a normal direction to the front surface FS, or a thickness direction of the display device DD. In this description, the phrases "in a plan view", "when viewed in plan" or "when viewed on a plane", or other similar phrases, may mean "when viewed along the third direction DR3." The third direction DR3 differentiates front and rear surfaces (or top and bottom surfaces) of each layer or unit which will be discussed below. Directions indicated by the first, second, and third directions DR1, DR2, and DR3 are relative concepts and may denote respective opposite directions.

The display device DD displays an image through the transmission area TA. The image may include one or more of static images and dynamic images.

The transmission area TA may have a tetragonal shape parallel to each of the first direction DR1 and the second direction DR2. This, however, is illustrated as an example, and the transmission area TA is not limited to a particular shape, but may have various shapes according to the design of the display device DD.

The bezel area BZA may surround the transmission area TA. This, however, is merely an example, and the bezel area BZA may be located adjacent to only one side of the transmission area TA or may be omitted. An electronic apparatus according to some embodiments of the present invention may include various embodiments, without being limited to a particular embodiment.

The display device DD according to some embodiments of the present invention may use the front surface FS to detect a user's input that is externally applied. The user's input may be applied using an external object such as a user's body part touch, a stylus touch, light, heat, pressure, or any suitable type of input. In addition, the display device DD may detect not only an input in contact with the front surface FS, but an input in close vicinity or adjacent to the front surface FS.

For example, the display device DD may include a window 100, a display module 200, a circuit board 300, and an outer casing 400. The window 100 and the outer casing 400 are combined to define an appearance of the display device DD.

The window 100 is located on the display module 200 and covers a front surface IS of the display module 200. The window 100 may include an optically transparent insulation material. For example, the window 100 may include glass or plastic. The window 100 may have a single-layered or multi-layered structure. For example, the window 100 may have either a stack structure in which a plurality of plastic films are coupled through an adhesive or a stack structure in which a glass substrate is coupled through an adhesive to a plastic film.

The window 100 includes a front surface that is externally exposed. The front surface FS of the display device DD may be substantially defined by the front surface of the window 100. The transmission area TA may be an optically transparent region. The transmission area TA may have a shape that corresponds to that of an active area AA defined on the display module 200. For example, the transmission area TA entirely or at least partially overlaps the active area AA. An image displayed on the active area AA of the display module 200 may be externally visible through the transmission area TA.

The bezel area BZA may be a region whose transmittance of light is relatively less than that of the transmission area TA. The bezel area BZA defines the shape of the transmission area TA. The bezel area BZA may be adjacent to and may surround the transmission area TA.

The bezel area BZA may have a certain color. When the window 100 is provided in the form of a glass or plastic substrate, the bezel area BZA may be a cosmetic layer printed or deposited on one surface of the glass or plastic substrate. Alternatively, the bezel area BZA may be formed by coloring a related area of the glass or plastic substrate.

The bezel area BZA may cover a peripheral area NAA of the display module 200 and may prevent or reduce external visibility of the peripheral area NAA. This, however, is illustrated as an example, and the bezel area BZA may be omitted from the window 100 according to an embodiment of the present invention.

The display module 200 may display an image or may detect an external input that is applied from the outside. For example, referring to FIG. 2, the display module 200 includes a display panel DP and an input sensing layer ISU located on the display panel DP. The display panel DP includes a base substrate BS, and also includes a circuit element layer DP-CL, a display element layer DP-OLED, and an insulation layer TFL that are located on the base substrate BS.

According to an embodiment of the present invention, the display panel DP may be an emissive display panel and is not particularly limited in its type. For example, the display panel DP may be an organic light emitting display panel or a quantum-dot light emitting display panel. An emission layer of an organic light emitting display panel may include an organic light emitting material. An emission layer of the quantum-dot light emitting display panel may include a quantum-dot or a quantum-rod. The following will discuss an example in which an organic light emitting display panel is adopted as the display panel DP.

The display panel DP includes a display area DP-DA and a peripheral area DP-NDA. The display area DP-DA of the display panel DP corresponds to the active area AA of FIG. 1, and the peripheral area DP-NDA of the display panel DP corresponds to the peripheral are NAA of FIG. 1.

The base substrate BS may include at least one plastic film. The base substrate BS may include a flexible substrate, for example, a plastic substrate, a glass substrate, a metal substrate, or an organic/inorganic composite material substrate.

The circuit element layer DP-CL includes at least one intermediate insulation layer and a circuit element. The intermediate insulation layer includes at least one intermediate inorganic layer and at least one intermediate organic layer. The circuit element includes signal lines and a pixel driver circuit.

The display element layer DP-OLED includes a plurality of display elements. For example, the display elements may be provided in the form of organic light emitting elements. The display element layer DP-OLED may further include an organic layer such as a pixel definition layer.

The insulation layer TFL encapsulates the display element layer DP-OLED. The insulation layer TFL protects the display element layer DP-OLED against foreign substances such as moisture, oxygen, and dust particles. For example, the insulation layer TFL may be a thin-film encapsulation layer, and may include at least one layer.

The input sensing layer ISU is directly located on the display panel DP and detects externally applied inputs (e.g., user's inputs). In this description, the phrase "A is directly located on B" means that no adhesive layer is located between A and B. According to some embodiments, the input sensing layer ISU and the display panel DP may be fabricated in a successive process.

Referring back to FIG. 1, the front surface IS of the display module 200 includes the active area AA and the peripheral area NAA. The active area AA may not only be a display region that displays an image, but be an active region that detects an external input. The transmission area TA overlaps at least the active area AA. For example, the transmission area TA entirely or at least partially overlaps the active area AA. Accordingly, a user may recognize images through the transmission area TA or may provide an external input through the transmission area TA. This, however, is illustrated as an example, and the active area AA may be configured such that a region to display an image is separated from a region to detect an external input, but the present invention is not necessarily limited thereto.

The peripheral area NAA may be a region covered with the bezel area BZA. The peripheral area NAA is adjacent to the active area AA. The peripheral area NAA may surround the active area AA. The peripheral area NAA may include driver lines or driver circuits for driving the active area AA.

The peripheral area NAA may include one or more electronic elements or various signal lines or pads PD which provide the active area AA with electrical signals. The peripheral area NAA may be covered with the bezel area BZA and thus may not be externally visible.

For example, the pads PD may include first pads that are electrically connected to the display panel DP of FIG. 2, and may also include second pads that are electrically connected to the input sensing layer ISU of FIG. 2. The first pads and the second pads may be located on the same layer or on different layers from each other.

According to some embodiments, the display module 200 is assembled in a flat state in which the active area AA and the peripheral area NAA are each oriented toward the window 100. The, however, is illustrated as an example, and the peripheral area NAA of the display module 200 may be partially bent. In this case, a portion of the peripheral area NAA may be directed toward a rear surface of the display device DD, and thus the bezel area BZA may decrease in area on the front surface FS of the display device DD. Alternatively, the display module 200 may be assembled in a state in which a portion of the active area AA is also bent. Alternatively, the peripheral area NAA may be omitted from the display module 200 according to an embodiment of the present invention.

The circuit board 300 may be connected to the display module 200. The circuit board 300 may include a flexible board CF, a main board MB, and a detection control circuit TIC. The flexible board CF may include an insulation film and conductive lines mounted on the insulation film. The conductive lines are coupled to the pads PD and electrically connect the circuit board 300 to the display module 200.

The flexible board CF may be assembled in a bent state. Therefore, the main board MB may be located on a rear surface of the display module 200 and may be stably accommodated in a space of the outer casing 400.

The detection control circuit TIC may be located on the flexible board CF and electrically connected to ones of the pads PD. In this description, the detection control circuit TIC may provide the input sensing layer ISU with signals that control an operation of the input sensing layer ISU shown in FIG. 2, or may receive detection signals that detect external inputs from the input sensing layer ISU. According to some embodiments, the flexible board CF may be omitted, and in this case, the main board MB may be directly coupled to the display module 200. In this case, the detection control circuit TIC may be located on the main board MB.

According to some embodiments, the display module 200 may further include a driving control circuit that controls an operation of the display panel DP. The driving control circuit may overlap the peripheral area NAA and may be located on the base substrate BS of FIG. 2.

According to some embodiments, the main board MB may include signal lines and electronic elements. The electronic elements may be coupled to the signal lines and electrically connected to the display module 200.

Figure 3A:
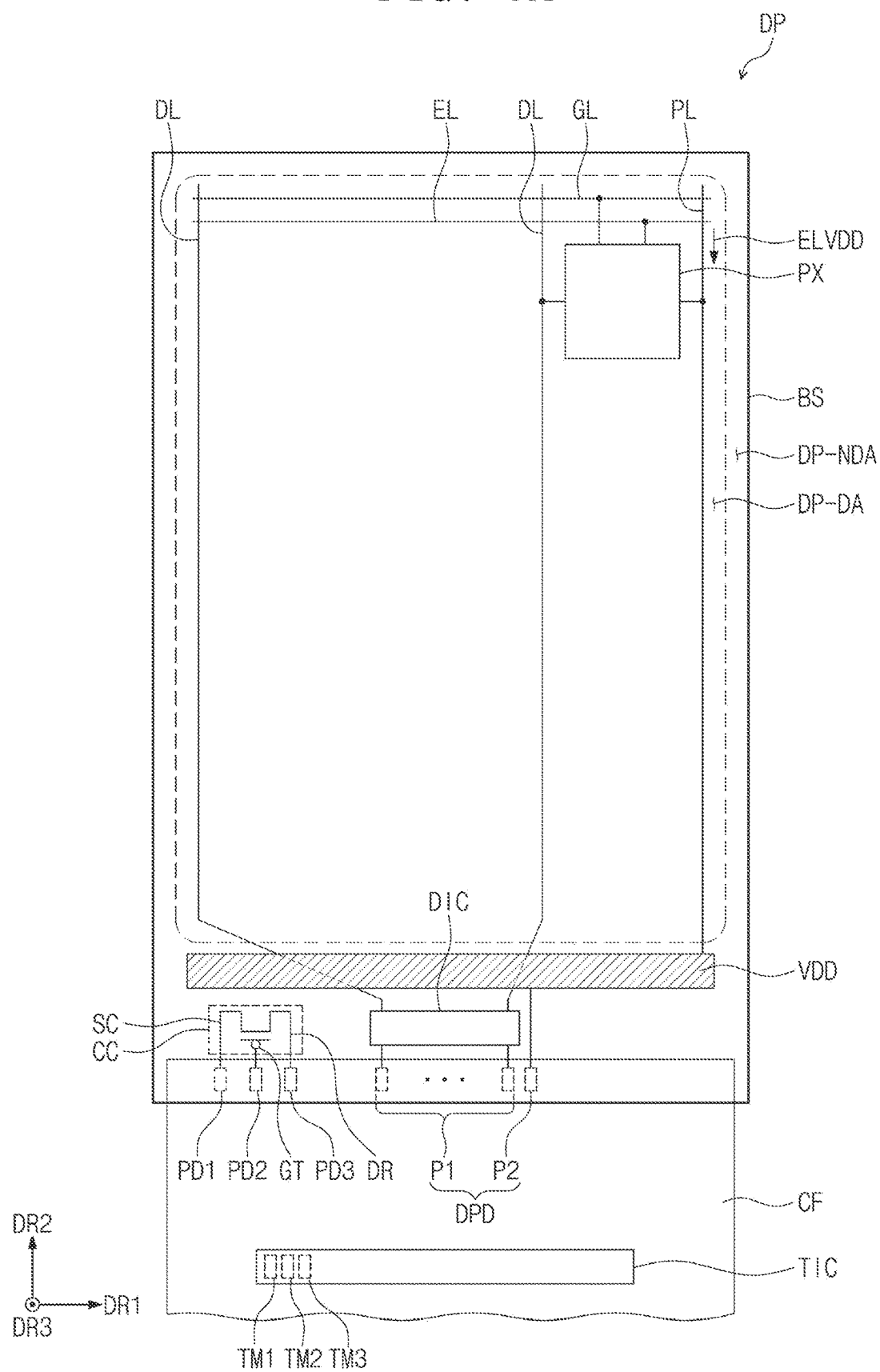
FIG. 3A illustrates a plan view showing a display panel, a flexible substrate, and a detection control circuit according to some embodiments of the present invention.
Figure 3B:
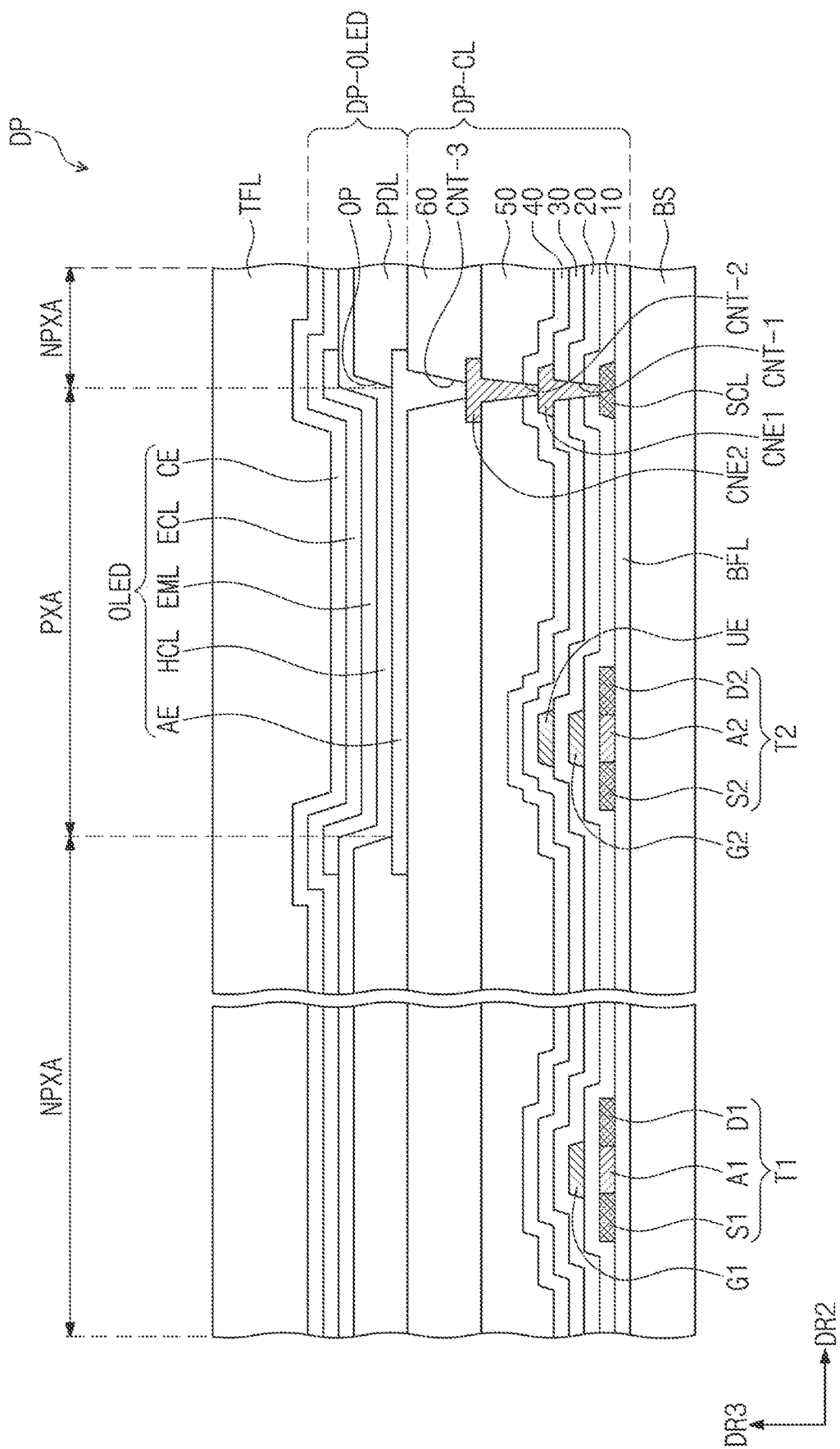
FIG. 3B illustrates a cross-sectional view partially showing a display panel that overlaps a display area according to some embodiments of the present invention.
Figure 3C:
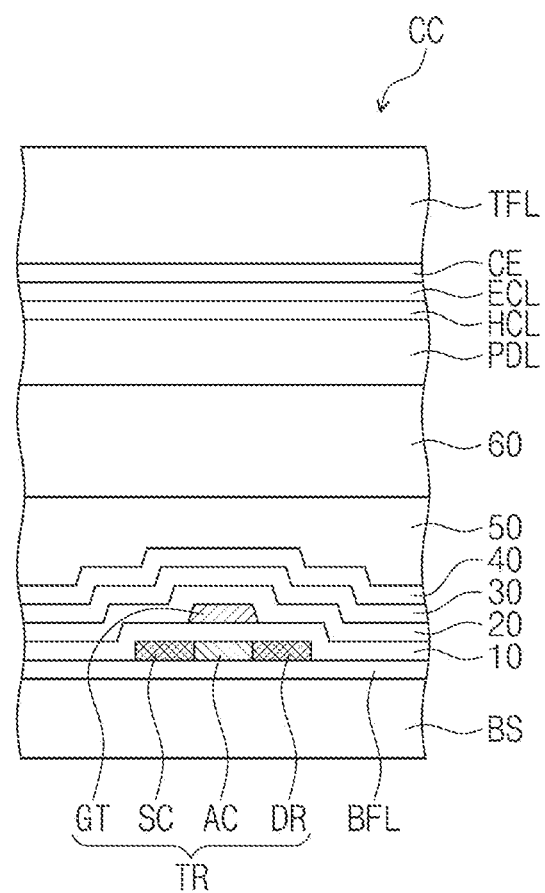
FIG. 3C illustrates a cross-sectional view showing a constant-current circuit according to some embodiments of the present invention.

FIG. 3A illustrates a plan view showing a display panel, a flexible substrate, and a detection control circuit according to some embodiments of the present invention. FIG. 3B illustrates a cross-sectional view partially showing a display panel that overlaps a display area according to some embodiments of the present invention. FIG. 3C illustrates a cross-sectional view showing a constant-current circuit according to some embodiments of the present invention.

Referring to FIG. 3A, the display panel DP may include a display area DP-DA and a peripheral area DP-NDA adjacent to the display area DP-DA. The display area DP-DA may be a region on which an image is displayed. A plurality of pixels PX may be located on the display area DP-DA. The peripheral area DP-NDA may be a region on which are located a driver line, a driver circuit, and the like.

The display panel DP may include a base substrate BS, a plurality of pixels PX, a plurality of signal lines GL, DL, PL, and EL, a plurality of display pads DPD, and a constant-current circuit CC.

Each of the plurality of pixels PX may display one of primary colors or one of mixed colors. The primary color may include a red color a green color, or a blue color. The mixed color may include a white color, a yellow color, a cyan color, a magenta color, or any other color. The colors displayed on the pixels PX, however, are not limited thereto.

The plurality of signal lines GL, DL, PL, and EL may be located on the base substrate BS. The plurality of signal lines GL, DL, PL, and EL may be connected to the plurality of pixels PX, transferring electrical signals to the plurality of pixels PX. The plurality of signal lines GL, DL, PL, and EL may include a plurality of scan lines GL, a plurality of data lines DL, a plurality of power lines PL, and a plurality of emission control lines EL. This, however, is merely an example, and no limitation is imposed on the configuration of the plurality of signal lines GL, DL, PL, and EL. For example, an initialization voltage line may further be included in the plurality of signal lines GL, DL, PL, and EL according to some embodiments of the present invention.

A power pattern VDD may be located on the peripheral area DP-NDA. The power pattern VDD may be coupled to the plurality of power lines PL. Each of the plurality of pixels PX may receive a power voltage ELVDD provided from the power line PL.

The plurality of display pads DPD may be located on the peripheral area DP-NDA. The plurality of display pads DPD may be called a plurality of first pads DPD. The plurality of display pads DPD may include a first pad P1 and a second pad P2. The first pad P1 may be provided in plural. The plurality of first pads P1 may be correspondingly connected to the plurality of data lines DL. The plurality of first pads P1 may be called a plurality of data pads P1. The second pad P2 may be connected to the power pattern VDD and electrically connected to the plurality of power lines PL. The second pad P2 may be called a power pad P2. The display panel DP may provide the plurality of pixels PX with electrical signals externally provided through the plurality of display pads DPD. The plurality of display pads DPD may further include, in addition to the first pad P1 and the second pad P2, pads for receiving other electrical signals, but the present invention is not limited to one embodiment.

A driving control circuit DIC may be mounted on the peripheral area DP-NDA. The driving control circuit DIC may be a chip-type timing control circuit. The plurality of data lines DL may be correspondingly electrically connected through the driving control circuit DIC to the plurality of first pads P1. This, however, is merely an example, and the driving control circuit DIC according to some embodiments of the present invention may be mounted on a separate film other than the display panel DP. The driving control circuit DIC may be electrically connected through the film to the plurality of display pads DPD.

The constant-current circuit CC may be located on the peripheral area DP-NDA. The constant-current circuit CC may include a first transistor. The first transistor may include a first gate GT, a first source SC, and a first drain DR.

A plurality of pads PD1, PD2, and PD3 may be located on the peripheral area DP-NDA. The plurality of pads PD1, PD2, and PD3 may be electrically connected to the constant-current circuit CC. The plurality of pads PD1, PD2, and PD3 may include a first pad PD1, a second pad PD2, and a third pad PD3. The first pad PD1 may be electrically connected to the first source SC. The second pad PD2 may be electrically connected to the first gate GT. The third pad PD3 may be electrically connected to the first drain DR.

The plurality of pads (see PD of FIG. 1) may include the plurality of display pads DPD and the plurality of pads PD1, PD2, and PD3. The flexible board CF may be located on the plurality of pads (see PD of FIG. 1). The flexible board CF may be electrically connected to the plurality of pads (see PD of FIG. 1).

The detection control circuit TIC may be located on the flexible board CF. The detection control circuit TIC may include a first terminal TM1, a second terminal TM2, and a third terminal TM3.

The first terminal TM1 may be electrically connected through the second pad PD2 to the first gate GT. The second terminal TM2 may be electrically connected through the first pad PD1 to the first source SC. The third terminal TM3 may be electrically connected through the third pad PD3 to the first drain DR.

Referring to FIG. 3B, the display panel DP may include a plurality of insulation layers, a semiconductor pattern, a conductive pattern, and a signal line. A coating or deposition process may be used to form an insulation layer, a semiconductor layer, and a conductive layer. Afterwards, a photolithography process may be performed to selectively pattern the insulation layer, the semiconductor layer, and the conductive layer. The processes mentioned above may form the semiconductor pattern, the conductive pattern, and the signal line that are included in the circuit element layer DP-CL and the display element layer DP-OLED. It will be explained that the display panel DP of FIG. 3B has additional elements in addition to the first and second transistors T1 and T2 of the pixel PX shown in FIG. 3A.

The base substrate BS may include a synthetic resin film. The synthetic resin film may include a thermosetting resin. The base substrate BS may have a multi-layered structure. For example, the base substrate BS may have a tri-layered structure including a synthetic resin layer, an adhesive layer, and a synthetic resin layer. For example, the synthetic resin layer may be a polyimide-based resin layer, and is not particularly limited in its material. The synthetic resin layer may include one or more of acryl-based resin, methacryl-based resin, polyisoprene, vinyl-based resin, epoxy-based resin, urethane-based resin, cellulose-based resin, siloxane-based resin, polyamide-based resin, and perylene-based resin. The base substrate BS may include one or more of a glass substrate, a metal substrate, and an organic/inorganic composite substrate.

At least one inorganic layer is formed on a top surface of the base substrate BS. The inorganic layer may include one or more of aluminum oxide, titanium oxide, silicon oxide, silicon oxynitride, zirconium oxide, and hafnium oxide. The inorganic layer may be formed multi-layered. The multi-layered inorganic layer may constitute a barrier layer and/or a buffer layer. According to some embodiments, the display panel DP is illustrated to include a buffer layer BFL.

The buffer layer BFL increases a bonding force between the base substrate BS and a semiconductor pattern. The buffer layer BFL may include a silicon oxide layer and a silicon nitride layer. The silicon oxide layer and the silicon nitride layer may be alternately stacked.

A semiconductor pattern is located on the buffer layer BFL. The semiconductor pattern may include polysilicon. Embodiments according to the present invention, however, are not limited thereto, and the semiconductor pattern may include amorphous silicon or metal oxide.

FIG. 3B shows an example of the semiconductor pattern, and in a plan view, the semiconductor pattern may further be located on a different area of the pixel PX. The semiconductor pattern may be, for example, arranged over the pixels PX. The semiconductor pattern may have an electrical property that is determined based on whether the semiconductor pattern is doped or not. The semiconductor pattern may include a doped region and an undoped region. The doped region may be implanted with n-type or p-type impurities. A p-type transistor includes a doped region implanted with p-type impurities.

The doped region has greater conductivity than that of the undoped region, and substantially serves as an electrode or a signal line. The undoped region substantially corresponds to an active (or channel) of a transistor. For example, a portion of the semiconductor pattern may be an active of a transistor, another portion of the semiconductor pattern may be a source or drain of the transistor, and still another portion of the semiconductor pattern may be a connection electrode or a connection signal line.

The first transistor T1 includes a source S1, an active A1, and a drain D1 that are formed from the semiconductor pattern, and the second transistor T2 includes a source S2, an active A2, and a drain D2 that are formed from the semiconductor pattern. When viewed in cross-section, the source S1 and the drain D1 extend in opposite directions from the active A2, and likewise, the source S2 and the drain D2 extend in opposite directions from the active A2. FIG. 3B partially shows a connection signal line SCL formed from the semiconductor pattern. According to some embodiments, when viewed in a plan view, the connection signal line SCL may be connected to the drain D2 of the second transistor T2.

A first insulation layer 10 is located on the buffer layer BFL. The first insulation layer 10 commonly overlaps a plurality of pixels PX and covers the semiconductor pattern. The first insulation layer 10 may be an inorganic layer and/or an organic layer, and may have a single-layered or multi-layered structure. The first insulation layer 10 may include one or more of aluminum oxide, titanium oxide, silicon oxide, silicon oxynitride, zirconium oxide, and hafnium oxide. According to some embodiments, the first insulation layer 10 may be a single-layered silicon oxide layer. Likewise the first insulation layer 10, an insulation layer of the circuit element layer DP-CL may be an inorganic layer and/or an organic layer, and may have a single-layered or multi-layered structure. The inorganic layer may include at least one selected from the materials mentioned above.

Gates G1 and G2 are located on the first insulation layer 10. Each of the gates G1 and G2 may be a portion of a metal pattern. The gates G1 and G2 overlap the actives A1 and A2, respectively. The gates G1 and G2 may serve as a mask in a process where the semiconductor pattern is doped.

The first insulation layer 10 is provided thereon with a second insulation layer 20 that covers the gates G1 and G2. The second insulation layer 20 commonly overlaps the pixels PX. The second insulation layer 20 may be an inorganic layer and/or an organic layer, and may have a single-layered or multi-layered structure. According to some embodiments, the second insulation layer 20 may be a single-layered silicon oxide layer.

An upper electrode UE may be located on the second insulation layer 20. The upper electrode UE may overlap the gate G2 of the second transistor T2. The upper electrode UE may be a portion of a metal pattern. The capacitor (see CP of FIG. 3A) may be defined by a portion of the gate G2 and the upper electrode UE that overlaps the portion of the gate G2.

The second insulation layer 20 is provided thereon with a third insulation layer 30 that covers the upper electrode UE. According to some embodiments, the third insulation layer 30 may be a single-layered silicon oxide layer. A first connection electrode CNE1 may be located on the third insulation layer 30. The first connection electrode CNE1 may be coupled to the connection signal line SCL through a contact hole CNT-1 that penetrates the first, second, and third insulation layers 10, 20, and 30.

The third insulation layer 30 is provided thereon with a fourth insulation layer 40 that covers the first connection electrode CNE1. The fourth insulation layer 40 may be a single-layered silicon oxide layer. A fifth insulation layer 50 is located on the fourth insulation layer 40. The fifth insulation layer 50 may be an organic layer. A second connection electrode CNE2 may be located on the fifth insulation layer 50. The second connection electrode CNE2 may be coupled to the first connection electrode CNE1 through a contact hole CNT-2 that penetrates the fourth and fifth insulation layers 40 and 50.

The fifth insulation layer 50 is provided thereon with a sixth insulation layer 60 that covers the second connection electrode CNE2. The sixth insulation layer 60 may be an organic layer.

The organic light emitting diode OLED includes a first electrode AE, a hole control layer HCL, an emission layer EML, an electron control layer ECL, and a second electrode CE.

The first electrode AE is located on the sixth insulation layer 60. The first electrode AE is connected to the second connection electrode CNE2 through a contact hole CNT-3 that penetrates the sixth insulation layer 60. An opening OP is defined in a pixel definition layer PDL. The opening OP of the pixel definition layer PDL exposes at least a portion of the first electrode AE.

The display area DA may include a pixel area PXA and a light-shield area NPXA adjacent to the pixel area PXA. The light-shield area NPXA may surround the pixel area PXA. According to some embodiments, the pixel area PXA is defined to correspond to a portion of the first electrode AE, which portion is exposed to the opening OP.

The hole control layer HCL may be located in common on the pixel area PXA and the light-shield area NPXA. The hole control layer HCL may include a hole transport layer and may further include a hole injection layer. The emission layer EML is located on the hole control layer HCL. The emission layer EML may be located on a region that corresponds to the opening OP. For example, the emission layer EML may be formed on each of pixels PX.

The electron control layer ECL is located on the emission layer EML. The electron control layer ECL may include an electron transport layer and may further include an electron injection layer. An open mask may be used such that the hole control layer HCL and the electron control layer ECL are formed in common on a plurality of pixels PX. The second electrode CE is located on the electron control layer ECL. The second electrode CE has a unitary shape and is arranged in common on a plurality of pixels PX.

An insulation layer TFL is located on the second electrode CE. According to some embodiments of the present invention, the insulation layer TFL may include a plurality of thin layers. For example, according to some embodiments, the insulation layer TFL may have a structure in which an inorganic layer and an organic layer are stacked.

FIG. 3C illustrates a cross-sectional view showing a constant-current circuit according to some embodiments of the present invention. In explaining FIG. 3C, the same reference symbols are allocated to the components discussed in FIG. 3B, and a repetitive description thereof will be omitted.

Referring to FIG. 3C, the constant-current circuit CC may include a first transistor TR. The first transistor TR may include a first gate GT, a first source SC, a first active AC, and a first drain DR.

The first source SC, the first active AC, and the first drain DR may be located on the buffer layer BFL. When viewed in cross-section, the first source SC and the first drain DR may extend in opposite directions from the first active AC.

The first gate GT may be located on the first insulation layer 10. The first gate GT may be a portion of a metal pattern. The first gate GT may overlap the first active AC. The first gate GT serves as a mask in a process where the semiconductor pattern is doped. The second insulation layer 20 may cover the first gate GT.

Figure 4A:
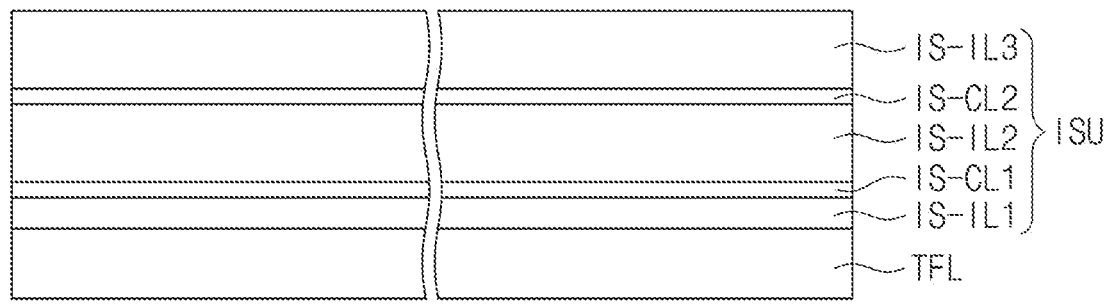
FIG. 4A illustrates a cross-sectional view showing a display module according to some embodiments of the present invention.
Figure 4B:
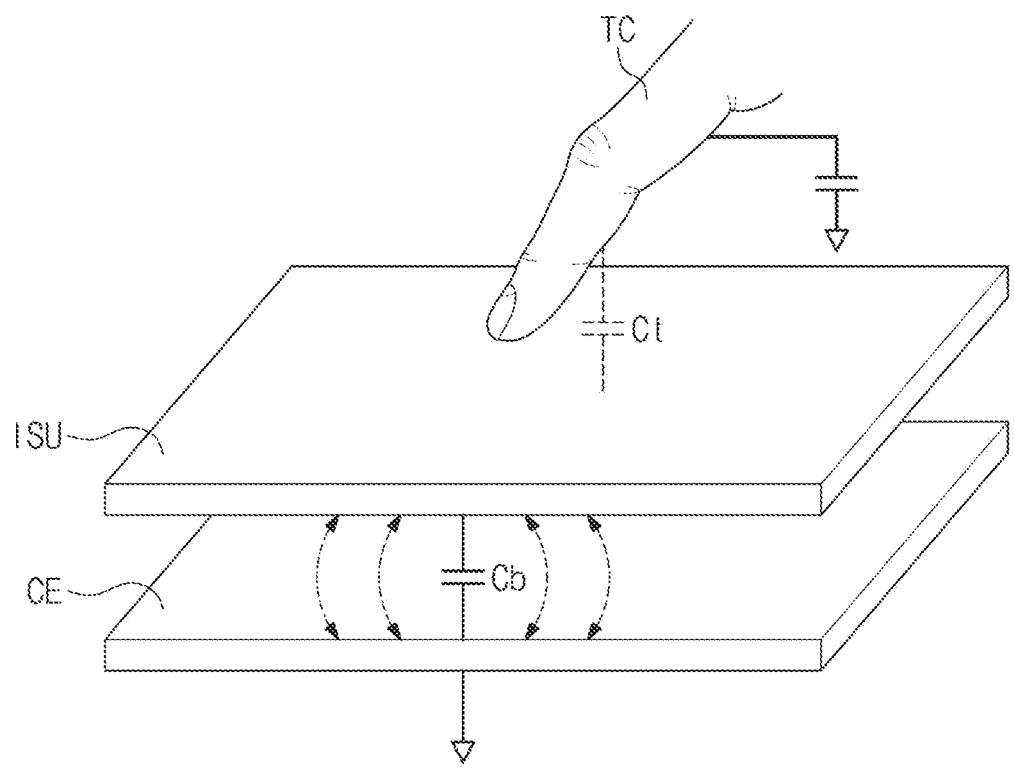
FIG. 4B illustrates a schematic diagram showing a capacitor that forms in a sensing operation of an input sensing layer according to some embodiments of the present invention.

FIG. 4A illustrates a cross-sectional view showing a display module according to some embodiments of the present invention. FIG. 4B illustrates a schematic diagram showing a capacitor that forms in a sensing operation of an input sensing layer according to some embodiments of the present invention.

Referring to FIG. 4A, the input sensing layer ISU may include a first sensing insulation layer IS-IL1, a first conductive layer IS-CL1, a second sensing insulation layer IS-IL2, a second conductive layer IS-CL2, and a third sensing insulation layer IS-IL3. The first sensing insulation layer IS-IL1 may be directly located on the insulation layer TFL. The technical concepts of the present invention, however, are not limited thereto. The first sensing insulation layer IS-IL1 may be omitted, and in this case, the first conductive layer IS-CL1 may be directly located on the insulation layer TFL.

Each of the first and second conductive layers IS-CL1 and IS-CL2 may have either a single-layered structure or a multi-layered structure in which layers are stacked along the third direction DR3. The multi-layered conductive layer may include at least two selected from transparent conductive layers and metal layers. The multi-layered conductive layer may include metal layers including different metals.

The transparent conductive layer may include indium tin oxide (ITO), indium zinc oxide (IZO), zinc oxide (ZnO), indium tin zinc oxide (ITZO), PEDOT, metal nano-wires, or graphene. The metal layer may include molybdenum, silver, titanium, copper, aluminum, or an alloy thereof. For example, each of the first and second conductive layers IS-CL1 and IS-CL2 may have a tri-layered structure, such as a stack of titanium/aluminum/titanium. The tri-layered structure may be configured such that an outer layer includes metal with high durability and low reflectance, and that an inner layer includes metal with high electrical conductivity.

According to some embodiments of the present invention, each of the first and second conductive layers IS-CL1 and IS-CL2 may include a sensing electrode that detects an external input. For example, the first conductive layer IS-CL1 may include a connection sensing electrode, and the second conductive layer IS-CL2 may include a first sensing electrode and a second sensing electrode that are spaced apart from each other when viewed in plan. The connection sensing electrode may be electrically connected to one of the first sensing electrode and the second sensing electrode.

Each of the first, second, and third sensing insulation layers IS-IL1, IS-IL2, and IS-IL3 may include an inorganic layer or an organic layer. According to some embodiments, the first sensing insulation layer IS-IL1 may be an inorganic layer. Embodiments according to the present invention, however, are not limited thereto. Each of the first and second sensing insulation layers IS-IL1 and IS-IL2 may include an inorganic layer, and the third sensing insulation layer IS-IL3 may include an organic layer.

Referring to FIG. 4B, the input sensing layer ISU may be arranged to be spaced apart at a certain interval in the third direction DR3 from the second electrode CE of the display panel DP. The second electrode CE may be included in the organic light emitting diode OLED of the display element layer DP-OLED illustrated in FIG. 2. For convenience of description, the second electrode CE will be explained below as a driving electrode.

According to that shown in FIGS. 4A and 4B, a parasitic capacitor Cb is formed between the driving electrode CE and the conductive layers IS-CL1 and IS-CL2 of the input sensing layer ISU. In addition, when an external input TC is in contact with or adjacent to the input sensing layer ISU, a voltage difference between the external input TC and the input sensing layer ISU may form a sensing capacitor Ct between the external input TC and the input sensing layer ISU. For example, the external input TC contacts or approaches the front surface of the window 100 discussed in FIG. 1.

According to some embodiments of the present invention, the detection control circuit (see TIC of FIG. 1) may use a difference in capacitance of the sensing capacitor Ct to determine the occurrence and position of touch by the external input TC.

The parasitic capacitor Cb may have its capacitance that corresponds to that of the sensing capacitor Ct. Therefore, the capacitance of the parasitic capacitor Cb may decrease reliability of the occurrence and position of touch by the external input TC.

According to some embodiments of the present invention, the detection control circuit TIC may use an offset capacitor to reduce the capacitance of the parasitic capacitor Cb. For example, the detection control circuit TIC may utilize an offset capacitor to control the capacitance of the parasitic capacitor Cb, thereby increasing reliability of the occurrence and position of touch by the external input TC. An offset capacitor will be further discussed in detail below with reference to FIG. 7.

Figure 5:
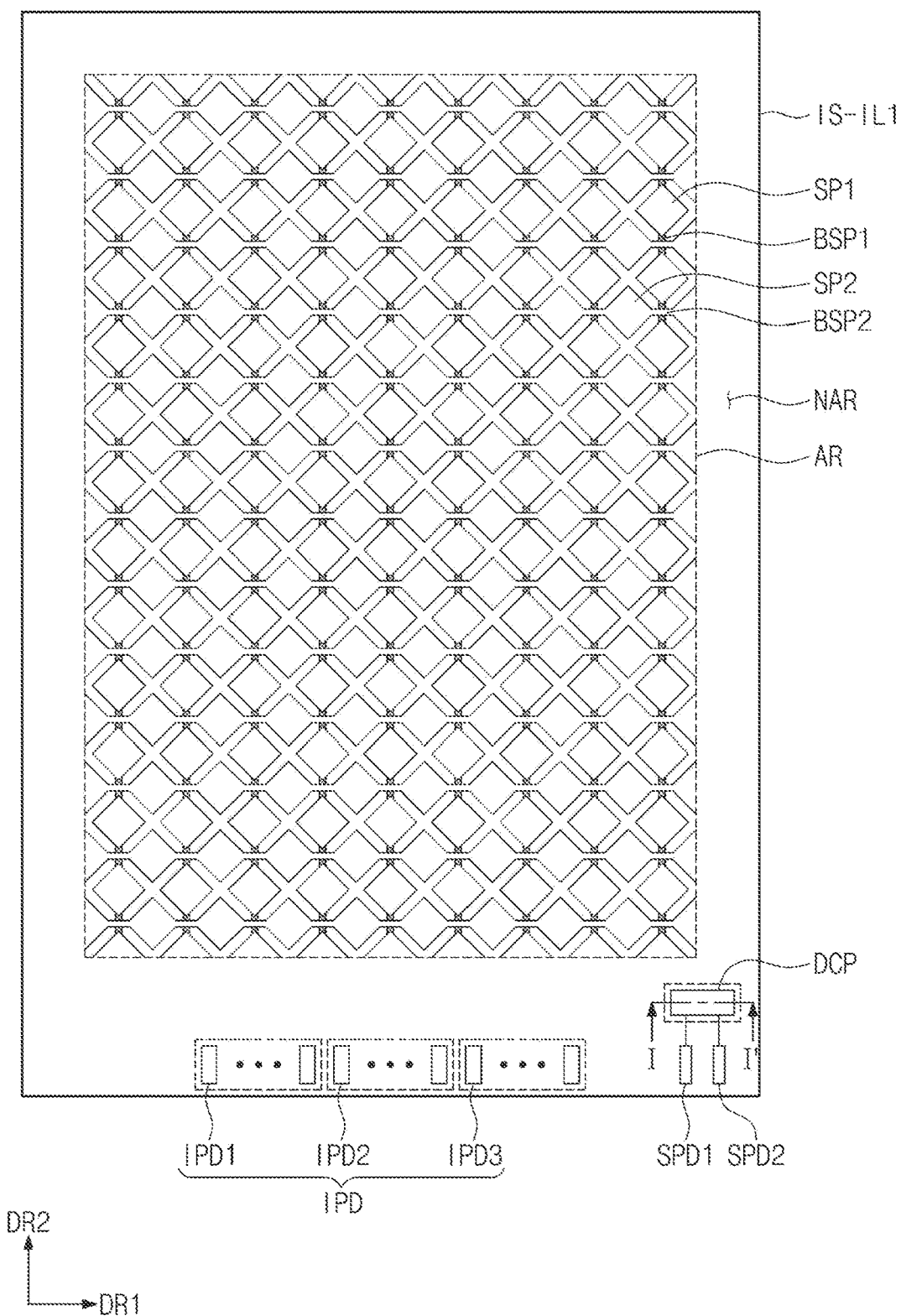
FIG. 5 illustrates a plan view showing an input sensing layer according to some embodiments of the present invention.
Figure 6:
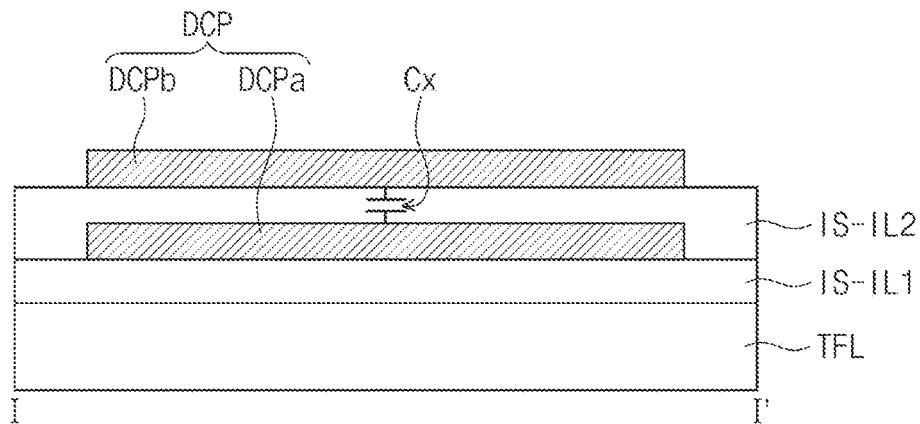
FIG. 6 illustrates a cross-sectional view taken along the line I-I' of FIG. 5.

FIG. 5 illustrates a plan view showing an input sensing layer according to some embodiments of the present invention. FIG. 6 illustrates a cross-sectional view taken along the line I-I' of FIG. 5.

Referring to FIG. 5, the input sensing layer ISU includes a sensing region AR and a non-sensing region NAR adjacent to the sensing region AR. The sensing region AR may correspond to the active area AA of the display module 200 defined in FIG. 1, and the non-sensing region NAR may correspond to the peripheral area NAA of the display module 200.

For example, the input sensing layer ISU includes first sensing electrodes, second sensing electrodes, first connectors BSP1, second connectors BSP2, second pads IPD, and a compensation electrode DCP. The first sensing electrodes, the second sensing electrodes, the first connectors BSP1, and the second connectors BSP2 overlap the sensing region AR, and the second pads IPD and the compensation electrode DCP overlap the non-sensing region NAR.

The first sensing electrodes extend in the first direction DR1 and are arranged in the second direction DR2. The number of the first sensing electrodes is n (where, n is a natural number). The first sensing electrodes are spaced apart from each other when viewed in plan, and include a plurality of first sensing parts SP1 arranged in the first direction DR1.

The second sensing electrodes extend in the second direction DR2 and are arranged in the first direction DR1. The number of the second sensing electrodes is m (where, m is a natural number). The second sensing electrodes are spaced apart from each other when viewed in plan, and include a plurality of second sensing parts SP2 arranged in the second direction DR2. When viewed in plan, the second sensing parts SP2 may be spaced apart and insulated from the first sensing parts SP1.

The first connectors BSP1 may connect the first sensing parts SP1 to each other. For example, a single first connector BSP1 may electrically connect two first sensing parts SP1 that neighbor in the first direction DR1.

The second connectors BSP2 may connect the second sensing parts SP2 to each other. For example, a single second connector BSP2 may electrically connect two second sensing parts SP2 that neighbor in the second direction DR2. According to some embodiments of the present invention, the second connectors BSP2 and the second sensing parts SP2 may have a unitary shape formed in the same process. The first connectors BSP1 and the second connectors BSP2 may intersect each other when viewed in plan and may be insulated from each other when viewed in cross-section.

According to some embodiments of the present invention, the first sensing parts SP1, the second sensing parts SP2, and the second connectors BSP2 may be formed of the same material in the same process, and may be included in the second conductive layer IS-CL2 discussed above in FIG. 4A. For example, the first sensing parts SP1, the second sensing parts SP2, and the second connectors BSP2 may be directly located on the second sensing insulation layer IS-IL2.

According to some embodiments of the present invention, the first connectors BSP1 may be included in the first conductive layer IS-CL1 discussed in FIG. 4A. The first connectors BSP1 may be directly located on the first sensing insulation layer IS-IL1. The first connectors BSP1 may be electrically connected to the first sensing parts SP1 through contact holes defined in the first sensing insulation layer IS-IL1.

However, components included in the first and second conductive layers IS-CL1 and IS-CL2 are not necessarily limited thereto, and may be variously changed. For example, the first sensing parts SP1, the second sensing parts SP2, and the second connectors BSP2 may be included in the first conductive layer IS-CL1, and the first connectors BSP1 may be included in the second conductive layer IS-CL2.

The second pads IPD include a first sensing pad IPD1, a second sensing pad IPD2, and a third sensing pad IPD3. Each of the first, second, and third sensing pads IPD1, IPD2, and IPD3 may be provided in plural.

The first sensing pads IPD1 may be connected to corresponding ends of the first sensing electrodes, and the second sensing pads IPD2 may be connected to corresponding ends of the first sensing electrodes. The third sensing pads IPD3 may be connected to corresponding ends of the second sensing electrodes.

Although not shown in FIG. 5, the input sensing layer ISU may include first lines that connect the first sensing pads IPD1 to the corresponding ones of the first sensing electrodes, second lines that connect the second sensing pads IPD2 to the corresponding other ends of the first sensing electrodes, and third lines that connect the third sensing pads IPD3 to the corresponding ends of the second sensing electrodes.

The first, second, and third sensing pads IPD1, IPD2, and IPD3 may be electrically bonded to the flexible board CF shown in FIG. 1. Therefore, the detection control circuit (see TIC of FIG. 1) may be electrically connected to the first and second sensing pads IPD1 and IPD2, and may output detection signals to the first and second sensing pads IPD1 and IPD2. As a result, the detection signals may be applied through the first and second sensing pads IPD1 and IPD2 to the first sensing electrodes.

In addition, the detection control circuit TIC may be electrically connected to the third sensing pads IPD3 and may receive detection signals from the third sensing pads IPD3 connected to the second sensing electrodes.

According to some embodiments of the present invention, the compensation electrode DCP may overlap the non-sensing region NAR and may be located on the first sensing insulation layer IS-IL1. The compensation electrode DCP may be electrically connected to a fourth sensing pad SPD1 and a fifth sensing pad SPD2. The fourth and fifth sensing pads SPD1 and SPD2 may be overlap the non-sensing region NAR and may be electrically bonded to the flexible board CF.

The detection control circuit TIC may output a compensation signal through the fourth sensing pad SPD1 to the compensation electrode DCP, and may receive an offset detection signal through the fifth sensing pad SPD2 from the compensation electrode DCP. As a result, based on an offset detection signal, a detection signal, and capacitance of the parasitic capacitor Cb shown in FIG. 4B, the detection control circuit TIC may determine the occurrence and position of touch by the external input TC.

The detection signal may indicate capacitance of a mutual capacitor (see Cm of FIG. 8) formed between the first sensing electrode and the second sensing electrode that are illustrated in FIG. 5. For example, the capacitance of the mutual capacitor Cm may be changed depending on capacitance of the sensing capacitor Ct formed by the external input TC shown in FIG. 4B. In addition, the offset detection signal may denote capacitance of an offset capacitor (see Cx of FIG. 6) formed by the compensation electrode DCP.

According to some embodiments of the present invention, the capacitance of the parasitic capacitor Cb may be controlled by the capacitance of the offset capacitor Cx formed by the compensation electrode DCP. For example, because the capacitance of the offset capacitor Cx counterbalances the capacitance of the parasitic capacitor Cb, the detection control circuit TIC may precisely detect a difference in capacitance of the mutual capacitor Cm, which capacitance of the mutual capacitor Cm corresponds to the detection signal.

To be specific, referring to FIG. 6, the compensation electrode DCP includes a first compensation electrode DCPa and a second compensation electrode DCPb that are located at different levels from each other. The first compensation electrode DCPa may be directly located on the first sensing insulation layer IS-IL1, and may be placed at the same level as that of the first connectors BSP1 illustrated in FIG. 5. The second compensation electrode DCPb may be directly located on the second sensing insulation layer IS-IL2, and may be placed at the same level as that of the first sensing electrodes, the second sensing electrodes, and the second connectors BSP2.

According to some embodiments of the present invention, when viewed along a thickness direction, the first compensation electrode DCPa may be closer than the second compensation electrode DCPb to the insulation layer TFL. In this description, the thickness direction may indicate the third direction DR3 shown in FIG. 1.

The first compensation electrode DCPa may have an electrical connection with the fourth sensing pad (see SPD1 of FIG. 5), and may receive through the fourth sensing pad SPD1 a compensation signal that is output from the detection control circuit (see TIC of FIG. 1). The second compensation electrode DCPb may have an electrical connection with the fifth sensing pad (see SPD2 of FIG. 5), and the detection control circuit (see TIC of FIG. 1) may sense through the fifth sensing pad SPD2 an offset detection signal that is output from the second compensation electrode DCPb.

For example, according to some embodiments of the present invention, the compensation signal that is output to the first compensation electrode DCPa may be a signal whose phase is inverted to that of a detection signal that is output to the first sensing electrode. As a result, there may be achieved a counterbalance between the capacitance of the parasitic capacitor Cb illustrated in FIG. 4B and the capacitance of the offset capacitor Cx formed by the first and second compensation electrodes DCPa and DCPb.

Figure 7:
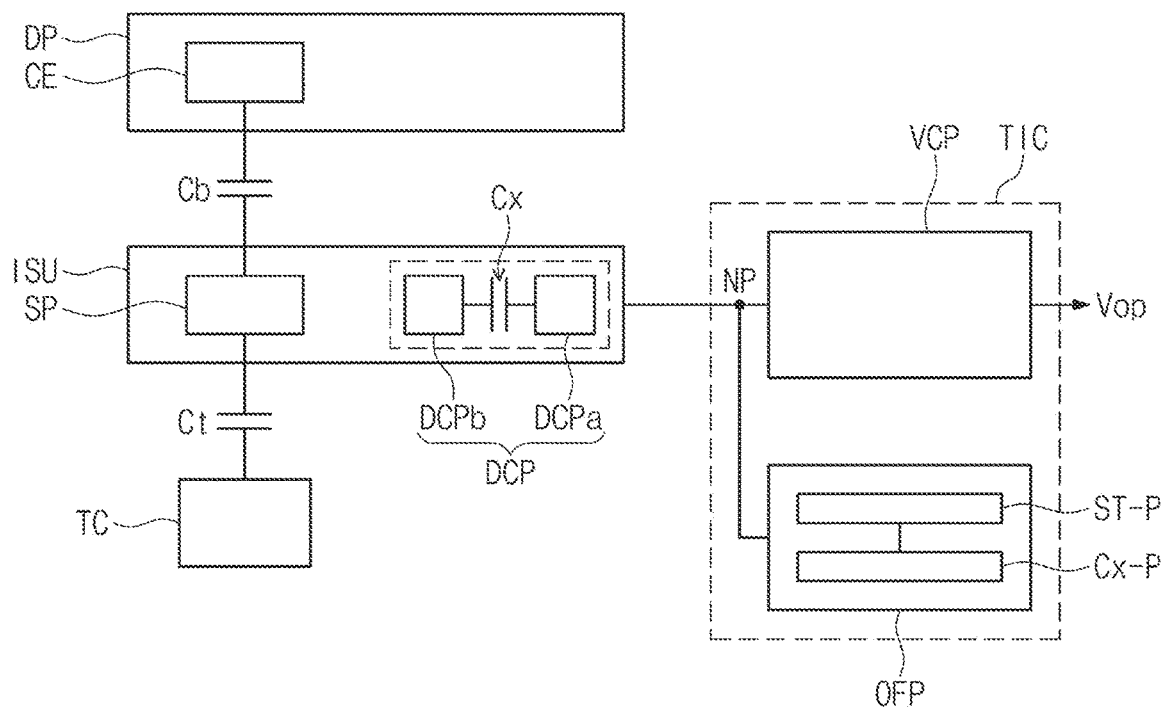
FIG. 7 illustrates a block diagram showing a sensing operation of an input sensing layer according to some embodiments of the present invention.
Figure 8:
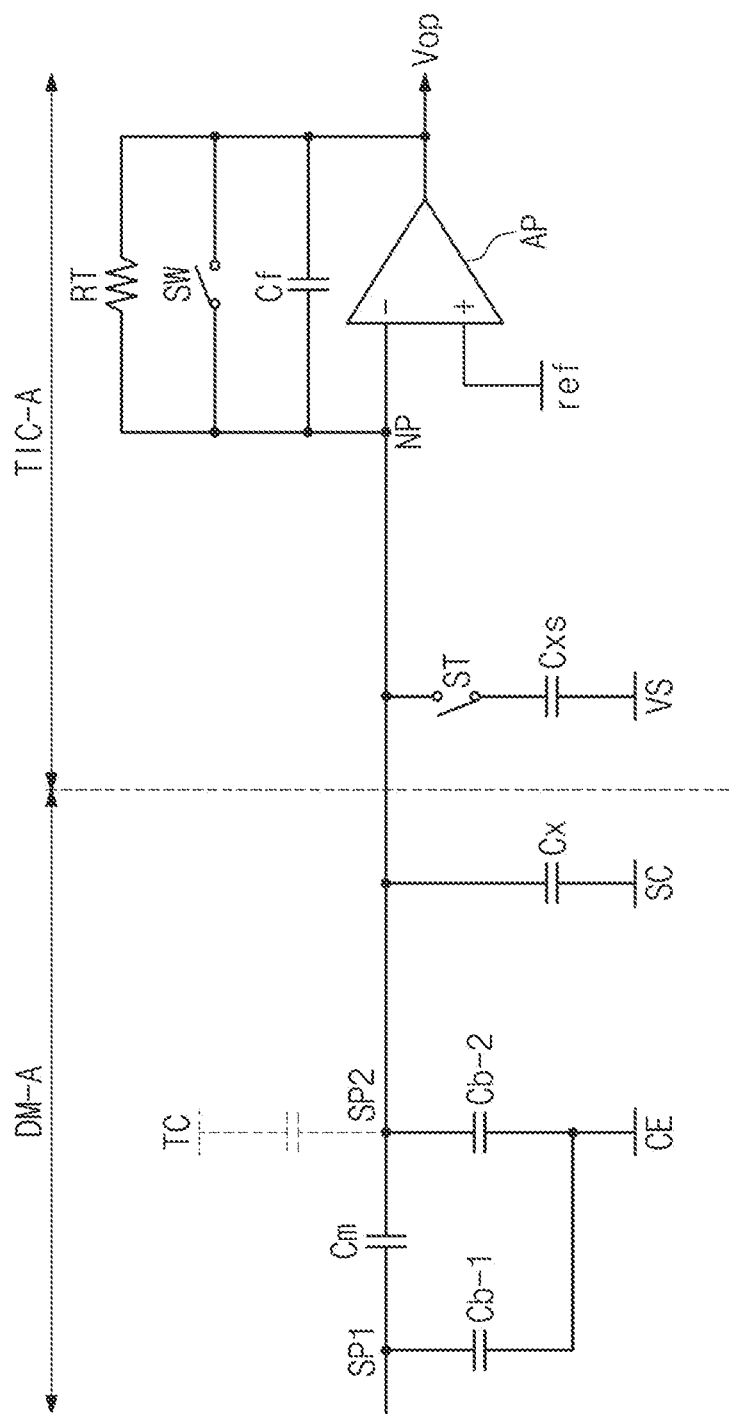
FIG. 8 illustrates a circuit diagram showing an electrical connection relationship between an input sensing layer and a detection control circuit according to some embodiments of the present invention.

FIG. 7 illustrates a block diagram showing a sensing operation of an input sensing layer according to some embodiments of the present invention. FIG. 8 illustrates a circuit diagram showing an electrical connection between an input sensing layer and a detection control circuit according to some embodiments of the present invention.

FIG. 7 discloses a connection structure between the input sensing layer ISU, the display panel DP, and the detection control circuit TIC. With reference to FIGS. 7 and 8, the following will discuss characteristics of an electrical connection between the input sensing layer ISU, the display panel DP, and the detection control circuit TIC. The detection control circuit TIC may be electrically connected through an output node NP to the display panel DP and the input sensing layer ISU.

For example, referring to FIG. 7, the parasitic capacitor Cb may be formed between the second electrode CE of the display panel DP and sensing electrodes SP of the input sensing layer ISU. The parasitic capacitor Cb may be electrically connected to the output node NP. The sensing electrodes SP may indicate the first sensing electrodes including the first sensing parts SP1 of FIG. 5 and the second sensing electrodes including the second sensing parts SP2 of FIG. 5.

In addition, the sensing capacitor Ct may be formed between the sensing electrodes SP and the external input TC that is in contact with or adjacent to the front surface FS of the display device DD shown in FIG. 1. The sensing capacitor Ct may be electrically connected to the output node NP.

The input sensing layer ISU may be electrically connected through the output node NP to the detection control circuit TIC. The input sensing layer ISU may include the compensation electrode DCP that counterbalances the capacitance of the parasitic capacitor Cb. The offset capacitor Cx may be formed between the first and second compensation electrodes DCPa and DCPb of the compensation electrode DCP, and may be electrically connected to the output node NP.

According to some embodiments of the present invention, a detection signal may be output to the first sensing parts SP1 included in the first sensing electrodes of the sensing electrode SP, and a compensation signal, whose phase is inverted to that of the detection signal, may be output to the first compensation electrode DCPa of the compensation electrode DCP. Consequently, there may be achieved a counterbalance between the capacitance of the offset capacitor Cx and the capacitance of the parasitic capacitor Cb, which offset and parasitic capacitors Cx and Cb are connected in parallel to each other through the output node NP.

According to that mentioned above, the detection control circuit TIC may sum up the capacitance of the parasitic capacitor Cb, the capacitance of the offset capacitor Cx and the capacitance of the sensing capacitor Ct, which capacitances are input through the output node NP. In this case, the capacitances of the offset and parasitic capacitors Cx and Cb may counterbalance each other, and thus the detection control circuit TIC may determine a touch position, based on the capacitance of the sensing capacitor Ct formed by the external input TC. It may thus be possible to increase overall reliability of the occurrence and position of touch by the external input TC.

The capacitance of the parasitic capacitor Cb may be changed depending on a variation in temperature inside of the display device (see DD of FIG. 1) and a variation in temperature outside of the display device (see DD of FIG. 1). According to some embodiments of the present invention, the compensation electrode DCP may be located in the input sensing layer ISU. Accordingly, the capacitance of the offset capacitor Cx may also be changed depending on a variation in temperature inside and outside of the display device DD. For example, when the capacitance of the parasitic capacitor Cb is changed due to the variation in temperature inside and outside of the display device DD, the capacitance of the offset capacitor Cx may also be changed in correspondence to the change in capacitance of the parasitic capacitor Cb, which may result in an improvement in quality of signals that are sensed through the output node NP.

The detection control circuit TIC according to some embodiments of the present invention includes a voltage converter VCP and an offset controller OFP. The voltage converter VCP may be electrically connected to the output node NP, and may output a detection voltage Vop by sensing a variation in capacitance sensed through the output node NP. For example, the voltage converter VCP may sense a variation in capacitance that is a sum of the capacitance of the parasitic capacitor Cb, the capacitance of the offset capacitor Cx and the capacitance of the sensing capacitor Ct The offset controller OFP may be electrically connected to the output node NP, and may control a variation in capacitance applied to the output node NP. For example, the offset controller OFP may invalidate a component of the parasitic capacitor Cb applied to the output node NP. In this case, the capacitance of the parasitic capacitor Cb applied to the output node NP may be controlled by the offset controller OFP and the offset capacitor Cx.

The offset controller OFP includes an auxiliary capacitor part Cx-P and a switching part ST-P that controls an operation of the auxiliary capacitor part Cx-P. An auxiliary offset capacitor formed by the auxiliary capacitor part Cx-P may change a value of capacitance sensed from the output node NP.

In FIG. 8 below, the offset capacitor Cx formed by the compensation electrode DCP is explained as a first offset capacitor Cx, and the auxiliary offset capacitor formed by the auxiliary capacitor part Cx-P is explained as a second offset capacitor Cxs.

Referring to FIG. 8, the parasitic capacitor Cb shown in FIG. 7 may include a first parasitic capacitor Cb-1 between the second electrode CE and the first sensing part SP1 of the first sensing electrode, and may also include a second parasitic capacitor Cb-2 between the second electrode CE and the second sensing part SP2 of the second sensing electrode.

In addition, there may be a variation in capacitance of a mutual capacitor Cm between the first and second sensing electrodes depending on the external input TC. Actually, when the external input TC is provided, a first sensing capacitor may be formed between the external input TC and the first sensing part SP1, and a second sensing capacitor may be formed between the external input TC and the second sensing part SP2.

For example, when the external input TC approaches, capacitance of each of the first and second sensing capacitors may be reflected in capacitance sensed to the output node NP. For another example, when the external input TC does not approach, capacitance sensed to the output node NP may be a sum of capacitances of first and second parasitic capacitors Cb-1 and Cb-2 and capacitances of the first and second offset capacitors Cx and Cxs.

According to some embodiments of the present invention, the first offset capacitor Cx may be formed by the compensation electrode DCP shown in FIG. 7, and the compensation electrode DCP may be located in an inside DM-A of the display module DM. The first compensation electrode DCPa of two compensation electrodes that form the first offset capacitor Cx may be electrically connected to the fourth sensing pad (see SPD1 of FIG. 5), and may receive a compensation signal SC through the fourth sensing pad SPD1. The compensation signal SC may be output from the detection control circuit TIC. The second compensation electrode DCPb of two compensation electrodes that form the first offset capacitor Cx may be electrically connected to the output node NP.

In this configuration, because the first compensation electrode DCPa and the second compensation electrode DCPb are located in the inside DM-A of the display module DM, the capacitance of the first offset capacitor Cx may be changed depending on a variation in temperature inside and outside of the display module DM.

The auxiliary capacitor part Cx-P of the offset controller OFP shown in FIG. 7 may include at least one second offset capacitor Cxs electrically connected to the output node NP. It is described as an example that the auxiliary capacitor part Cx-P of FIG. 8 includes a single auxiliary capacitor Cxs.

The second offset capacitor Cxs may be located in an inside TIC-A of the detection control circuit TIC. For example, the offset controller OFP may use the second offset capacitor Cxs electrically connected to the output node NP, and may thus control capacitance sensed to the output node NP. One of two compensation electrodes that form the second offset capacitor Cxs may receive an offset signal VS, which offset signal VS may be substantially the same as the compensation signal SC. Therefore, the first and second offset capacitors Cx and Cxs may counterbalance the capacitances of the first and second parasitic capacitors Cb-1 and Cb-2. The other of two compensation electrodes that form the second offset capacitor Cxs may be electrically connected to the output node NP.

According to some embodiments of the present invention, the capacitance of the second offset capacitor Cxs may be less than that of the first offset capacitor Cx. For example, the offset controller OFP may use the second offset capacitor Cxs to precisely control a variation in capacitance sensed to the output node NP.

The switching part ST-P of the offset controller OFP shown in FIG. 7 may include one or more switches the number of which is the same as the number of second offset capacitors Cxs. For example, as shown in FIG. 8, the switching part ST-P may include one switch ST in correspondence to a single second offset capacitor Cxs. An end of the switch ST may be electrically connected to the other of two compensation electrode that form the second offset capacitor Cxs, and other end of the switch ST may be electrically connected to the output node NP.

In this configuration, the offset controller OFP may control an operation of the switch ST, and may thus control a value of capacitance sensed to the output node NP. For example, in order to offset the capacitance of the parasitic capacitor Cb sensed from the output node NP, the offset controller OFP may turn on the switch ST to allow the second offset capacitor Cxs to have an electrical connection with the output node NP. For another example, when there is no need to offset the capacitance of the parasitic capacitor Cb sensed from the output node NP, the offset controller OFP may turn off the switch ST to allow the second offset capacitor Cxs to may not have an electrical connection with the output node NP.

The voltage converter VCP shown in FIG. 7 includes an operational amplifier AP, a capacitor Cf, a switch SW, and a resistor RT.

The operational amplifier AP may have a first input node (e.g., negative input node) to which is applied a signal that passes through the output node NP. The operational amplifier AP may have a second input node (e.g., positive input node) to which is applied a reference signal ref that operates at a regular period. The capacitor Cf is provided between the output node of the operational amplifier AP and the first input node of the operational amplifier AP. The capacitor Cf, the switch SW, and the resistor RT may be connected in parallel to each other.

The reference signal ref may be a voltage signal for generating a current of the output node NP and sensing a current variation due to touch. For example, the reference signal ref may be achieved in the form of a square wave. While a voltage of the reference signal ref swings in a certain voltage range, the operational amplifier AP may convert a current sensed from the output node NP into a voltage. The detection voltage Vop may be provided as feedback from the operational amplifier AP through the switch SW to the output node NP.

FIG. 8 shows an example of the voltage converter VCP, but the structure of the voltage converter VCP is not necessarily limited thereto. For example, the voltage converter VCP may have a structure where the resistor RT is omitted or may further include an additional component that is connected parallel to the capacitor Cf.

Figure 9:
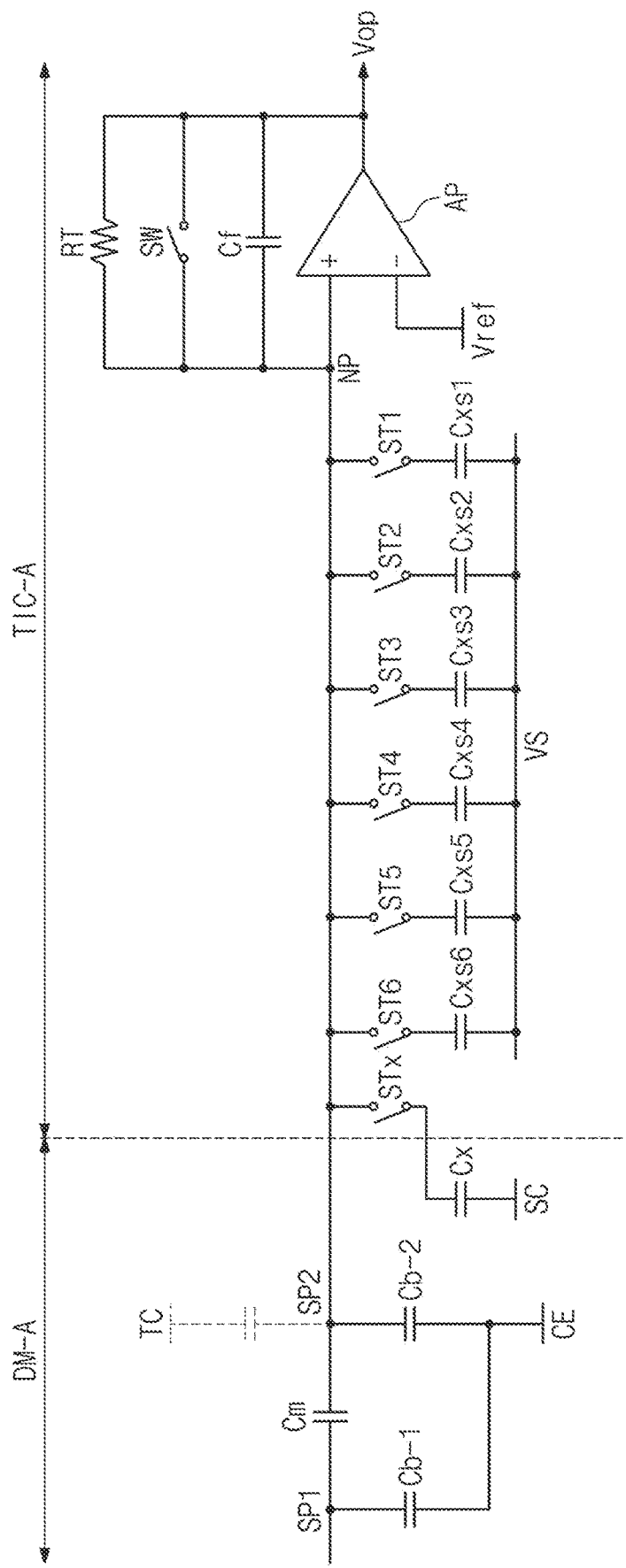
FIG. 9 illustrates a circuit diagram showing an electrical connection relationship between an input sensing layer and a detection control circuit according to some embodiments of the present invention.

FIG. 9 illustrates a circuit diagram showing an electrical connection relationship between an input sensing layer and a detection control circuit according to some embodiments of the present invention.

Compared with the circuit diagram shown in FIG. 8, the circuit diagram illustrated in FIG. 9 may have substantially the same structure as that of FIG. 8, except that the offset controller OFP is changed in structure. Accordingly, the following will focus on a structure of the offset controller OFP with reference to FIG. 9.

Referring to FIG. 9, the offset controller OFP shown in FIG. 7 includes an auxiliary capacitor part Cx-P including a plurality of second offset capacitors Cxs1, Cxs2, Cxs3, Cxs4, Cxs5, and Cxs6 (referred to hereinafter as Cxs1 to Cxs6), and also includes a switching part ST-P including a plurality of switches ST1, ST2, ST3, ST4, ST5, and ST6T (referred to hereinafter as ST1 to ST6).

The inside TIC-A of the detection control circuit TIC may have therein the second offset capacitors Cxs1 to Cxs6 that are connected in parallel to each other. One of two electrodes that form each of the second offset capacitors Cxs1 to Cxs6 may receive an offset signal VS, and the offset signal VS may be substantially the same as the compensation signal SC. The other of two electrodes that form each of the second offset capacitors Cxs1 to Cxs6 may be electrically connected to the output node NP.

The plurality of switches ST1 to ST6 may be correspondingly located between the output node NP and the plurality of second offset capacitors Cxs1 to Cxs6. The plurality of switches ST1 to ST6 may be turned on or turned off under control of the detection control circuit TIC.

According to some embodiments of the present invention, the offset controller OFP may use the plurality of switches ST1 to ST6 to control a variation in capacitance sensed from the output node NP. For example, the detection control circuit TIC may turn on ones of the switches ST1 to ST6, and may turn off remaining ones of the switches ST1 to ST6. As a result, among the second offset capacitors Cxs1 to Cxs6, ones connected to the ones of the switches ST1 to ST6 may be electrically connected to the output node NP.

According to some embodiments of the present invention, capacitance of each of the second offset capacitors Cxs1 to Cxs6 may be less than that of the first offset capacitor Cx. In addition, the second offset capacitors Cxs1 to Cxs6 may have their capacitances different from each other. For example, a first one Cxs1 of the second offset capacitors Cxs1 to Cxs6 may have its capacitance less than that of a second one Cxs2 of the second offset capacitors Cxs1 to Cxs6. The capacitance of the second one Cxs2 of the second offset capacitors Cxs1 to Cxs6 may be less than that of a third one Cxs3 of the second offset capacitors Cxs1 to Cxs6.

For example, the offset controller OFP may use the second offset capacitors Cxs1 to Cxs6 and the switches ST1 to ST6 to precisely control a variation in capacitance sensed to the output node NP.

In addition, the offset controller OFP includes an auxiliary switch STx that controls the first offset capacitor Cx formed in the inside DM-A of the display module DM. The auxiliary switch STx may be electrically connected between the output node NP and the second compensation electrode DCPb of the compensation electrode DCP. The offset controller OFP may control the capacitance of the first offset capacitor Cx, which capacitance is transmitted through the auxiliary switch STx to the output node NP.

Figure 10:
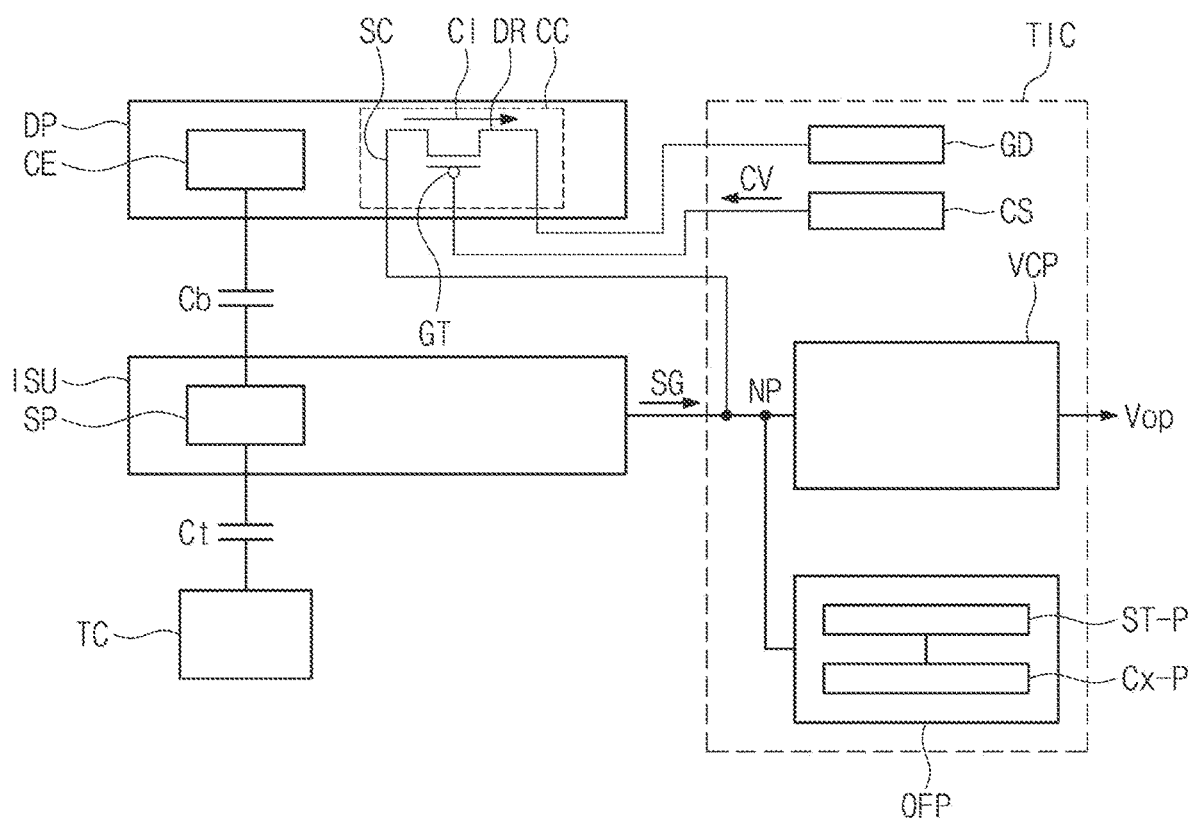
FIG. 10 illustrates a block diagram showing a sensing operation of an input sensing layer according to some embodiments of the present invention.

FIG. 10 illustrates a block diagram showing a sensing operation of an input sensing layer according to some embodiments of the present invention.

Referring to FIG. 10, the detection control circuit TIC may be electrically connected through an output node NP to the display panel DP and the input sensing layer ISU. The parasitic capacitor Cb may be formed between the driving electrode CE of the display panel DP and the sensing electrodes SP of the input sensing layer ISU. The parasitic capacitor Cb may be electrically connected to the output node NP.

In addition, the sensing capacitor Ct may be formed between the sensing electrodes SP and the external input TC in contact with or adjacent to the front surface (see FS of FIG. 1) of the display device DD shown in FIG. 1. The sensing capacitor Ct may be electrically connected to the output node NP.

The detection control circuit TIC may receive a signal SG from the sensing electrode SP. The signal SG may include the capacitance of the parasitic capacitor Cb and the capacitance of the sensing capacitor Ct.

The display panel DP may include the constant-current circuit CC. The constant-current circuit CC may be electrically connected through the output node NP to the detection control circuit TIC. The detection control circuit TIC may control the constant-current circuit CC to remove at least a portion of a component caused by the capacitance of the parasitic capacitor Cb from the signal SG that is input from the sensing electrode SP.

The constant-current circuit CC may include a first transistor. The first transistor may include a first gate GT, a first source SC, and a first drain DR. The first source SC may receive, from the second terminal (see TM2 of FIG. 3A), the signal SG sensed by the sensing electrode SP.

The detection control circuit TIC may include a control signal part CS, a ground electrode GD, an offset controller OFP, and a voltage converter VCP.

The control signal part CS may be electrically connected through the first terminal (see TM1 of FIG. 3A) to the first gate GT. The control signal part CS may provide the first gate GT with a control voltage CV.

The control signal part CS may use the control voltage CV to control on-off of the first transistor. The control voltage CV may be provided in a pulse width modulation manner. The control signal part CS may control on-time of the first transistor.

The ground electrode GD may be electrically connected through the third terminal (see TM3 of FIG. 3A) to the first drain DR. This, however, is merely an example, and as long as a constant voltage is provided, no limitation is imposed on the way how the first drain DR is connected. For example, the first drain DR may be electrically connected to the power line (see PL of FIG. 3A), and the power voltage ELVDD may be provided to the first drain DR.

The first transistor may be turned on in response to the control voltage CV, and a first current CI may flow through the first transistor.

Based on the first current CI, the constant-current circuit CC may provide the ground electrode GD with discharged electric charge that corresponds to a quantity of electric charge that is charged in the capacitance of the parasitic capacitor Cb. The discharged electric charge may remove at least a portion of the component caused by the capacitance of the parasitic capacitor Cb, which capacitance is included in the signal SG.

According to some embodiments of the present invention, the detection control circuit TIC may control the constant-current circuit CC to remove at least a portion of the component caused by the capacitance of the parasitic capacitor Cb from the signal SG that is input from the sensing electrode SP. The constant-current circuit CC may reduce a reference value of the signal SG sensed by the sensing electrode SP. There may be an increase in ratio of a component resulting from a variation in the capacitance of the sensing capacitor Ct to a reference value of a signal that is input to the output node NP. The detection control circuit TIC may easily detect the variation in the capacitance of the sensing capacitor Ct. It may be possible to improve reliability of the occurrence and position of touch by the external input TC. Accordingly, the display device (see DD of FIG. 1) may have an increased touch performance.

The offset controller OFP may be electrically connected to the output node NP, and may control the reference value of the signal that is input to the output node NP. For example, the offset controller OFP may remove at least a portion of the component caused by the capacitance of the parasitic capacitor Cb, which capacitance is applied to the output node NP. For example, in addition to the constant-current circuit CC, the offset controller OFP may additionally remove the component caused by the capacitance of the parasitic capacitor Cb, which capacitance is included in the signal applied to the output node NP.

The offset controller OFP may include an auxiliary capacitor part Cx-P and a switching part ST-P that controls an operation of the auxiliary capacitor part Cx-P. The reference value of the signal applied to the output node NP may be changed due to capacitance of an auxiliary capacitor resulting from the auxiliary capacitor part Cx-P.

The voltage converter VCP may be electrically connected to the output node NP, and may output a detection voltage Vop by sensing a variation in capacitance of a signal that is input through the output node NP.

According to some embodiments of the present invention, the detection control circuit TIC may receive a signal through the output node NP. The constant-current circuit CC may remove a portion of the component caused by the capacitance of the parasitic capacitor Cb from the signal SG sensed by the sensing electrode SP. The offset capacitor of the auxiliary capacitor part Cx-P may additionally remove a remainder of the component caused by the capacitance of the parasitic capacitor Cb from a signal processed in the constant-current circuit CC. There may thus be an increase in ratio of a component resulting from a variation in the capacitance of the sensing capacitor Ct to the reference value of the signal that is input to the output node NP. The detection control circuit TIC may easily detect the variation in the capacitance of the sensing capacitor Ct. It may be possible to improve reliability of the occurrence and position of touch by the external input TC. Accordingly, the display device (see DD of FIG. 1) may have an increased touch performance.

Figure 11:
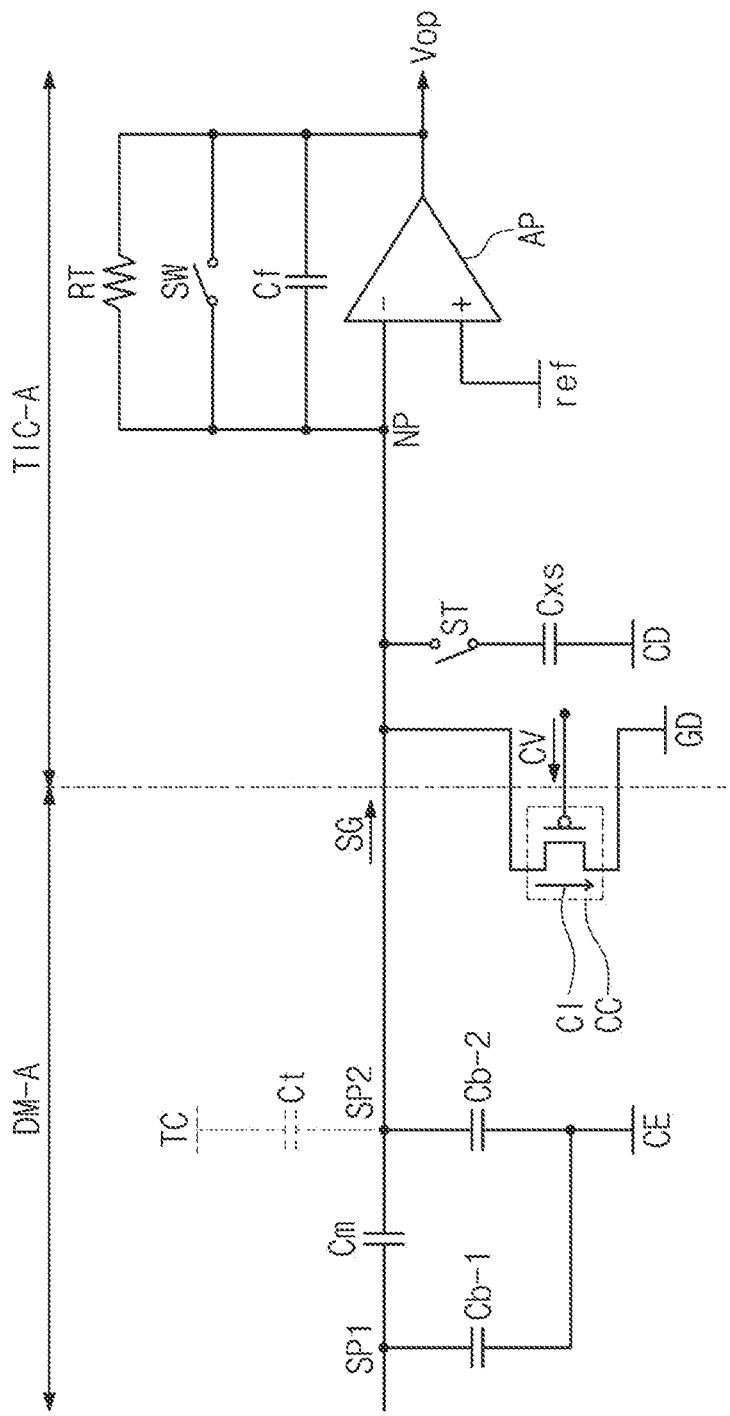
FIG. 11 illustrates a circuit diagram showing an electrical connection relationship between a detection control circuit and an input sensing layer according to some embodiments of the present invention.

FIG. 11 illustrates a circuit diagram showing an electrical connection relationship between a detection control circuit and an input sensing layer according to some embodiments of the present invention.

Referring to FIGS. 10 and 11, the parasitic capacitor Cb may include a first parasitic capacitor Cb-1 between the driving electrode CE and the first sensing part SP1 of the first sensing electrode (see the description of FIG. 7), and may also include a second parasitic capacitor Cb-2 between the driving electrode CE and the second sensing part SP2 of the second sensing electrode (see the description of FIG. 7).

In addition, the external input TC may cause a variation in capacitance of a mutual capacitor Cm defined between the first sensing part SP1 and the second sensing part SP2 that are located at the position with which the external input TC is in contact. The external input TC may cause that the sensing capacitor Ct is formed between the external input TC and the sensing electrodes SP. The sensing capacitor Ct may include a first sensing capacitor formed between the external input TC and the first sensing part SP1, and may also include a second sensing capacitor formed between the external input TC and the second sensing part SP2.

When the external input TC approaches, the signal SG may be provided with a component caused by capacitance of each of the first and second sensing capacitors.

According to some embodiments of the present invention, the constant-current circuit CC may be located in an inside DM-A of the display module DM. The constant-current circuit CC may be located on the display panel DP, and thus the detection control circuit TIC may decrease in size. The circuit board 300 may decrease in size, and the bezel area BZA of the display device DD may decrease in size (see FIG. 1).

The constant-current circuit CC may be turned on or off in response to the control voltage CV applied thereto. The first current CI may flow through the constant-current circuit CC in an on-state thereof. The constant-current circuit CC may be configured such that the first current CI is used to provide the ground electrode GD with at least a portion of charge associated with the signal SG. The detection control circuit TIC may use the constant-current circuit CC to remove at least a portion of a component caused by capacitance of each of the first and second parasitic capacitors Cb-1 and Cb-2, which capacitance is included in the signal SG.

According to some embodiments of the present invention, the detection control circuit TIC may be configured such that the constant-current circuit CC is used to reduce a reference value of the signal SG sensed by the sensing electrode SP. There may be an increase in ratio of a component resulting from a variation in the capacitance of the sensing capacitor Ct to a reference value of a signal provided to the output node NP. The detection control circuit TIC may easily detect the variation in the capacitance of the sensing capacitor Ct. It may be possible to improve reliability of the occurrence and position of touch by the external input TC. Accordingly, the display device (see DD of FIG. 1) may have an increased touch performance.

The auxiliary capacitor part Cx-P of the offset controller OFP may include at least one offset capacitor Cxs electrically connected to the output node NP. FIG. 11 depicts by way of example that one offset capacitor Cxs is included, but no limitation is imposed on the number of the offset capacitor Cxs according to some embodiments of the present invention.

The offset capacitor Cxs may be located in an inside TIC-A of the detection control circuit TIC. The offset controller OFP may be configured such that the offset capacitor Cxs electrically connected to the output node NP is used to additionally remove at least a portion of a remainder of the component caused by the capacitance of the parasitic capacitor Cb from a signal processed in the constant-current circuit CC. The offset capacitor Cxs may more precisely control the reference value of the signal provided to the output node NP. An offset signal CD may be received in one of two electrodes that constitute the offset capacitor Cxs. The offset signal SC may be output from the detection control circuit TIC.

The switching part ST-P of the offset controller OFP may include a switch the number of which is the same as that of the offset capacitor Cxs. FIG. 11 depicts by way of example that the switching part ST-P includes one switch ST that corresponds to one offset capacitor Cxs. The switch ST may have one end electrically connected to the offset capacitor Cxs and other end electrically connected to the output node NP.

The offset controller OFP may control an operation of the switch ST, and may additionally remove the component caused by the capacitance of the parasitic capacitor Cb, which capacitance is included in a signal. For example, when the constant-current circuit CC sufficiently removes the component caused by the capacitance of the parasitic capacitor Cb, the offset controller OFP may turn off the switch ST. When the constant-current circuit CC does not sufficiently remove the component caused by the capacitance of the parasitic capacitor Cb, the offset controller OFP may turn on the switch SW to additionally remove the component caused by the capacitance of the parasitic capacitor Cb, which capacitance is included in a signal.

According to some embodiments of the present invention, the detection control circuit TIC may control the constant-current circuit CC to remove at least a portion of the component caused by the capacitance of the parasitic capacitor Cb from the signal SG that is input from the sensing electrode SP. The detection control circuit TIC may control the offset controller OFP to additionally remove a remainder of the component caused by the capacitance of the parasitic capacitor Cb from a signal processed in the constant-current circuit CC. There may thus be an increase in ratio of a component resulting from a variation in the capacitance of the sensing capacitor Ct to the reference value of the signal that is input to the output node NP. The detection control circuit TIC may easily detect the variation in the capacitance of the sensing capacitor Ct. It may be possible to improve reliability of the occurrence and position of touch by the external input TC. Accordingly, the display device (see DD of FIG. 1) may have an increased touch performance.

The voltage converter VCP may include an operational amplifier AP, a capacitor Cf, a switch SW, and a resistor RT.

The operational amplifier AP may have a first input node (e.g., negative input node) to which is applied a signal that passes through the output node NP. The operational amplifier AP may have a second input node (e.g., positive input node) to which is applied a reference signal ref that operates at a regular period. The capacitor Cf is provided between the output node NP and the first input node of the operational amplifier AP. The capacitor Cf, the switch SW, and the resistor RT may be connected in parallel to each other.

The reference signal ref may be a voltage signal for generating a current of the output node NP and for sensing a current variation due to touch. For example, the reference signal ref may be achieved in the form of a square wave. While a voltage of the reference signal ref swings in a certain voltage range, the operational amplifier AP may convert a current sensed from the output node NP into a voltage. The detection voltage Vop may be provided as feedback from the operational amplifier AP through the switch SW to the output node NP.

This, however, is merely an example, and no limitation is imposed on the structure of the voltage converter VCP. For example, the voltage converter VCP may have a structure where the resistor RT is omitted, or may further include an additional component connected parallel to the capacitor Cf.

Figure 12:
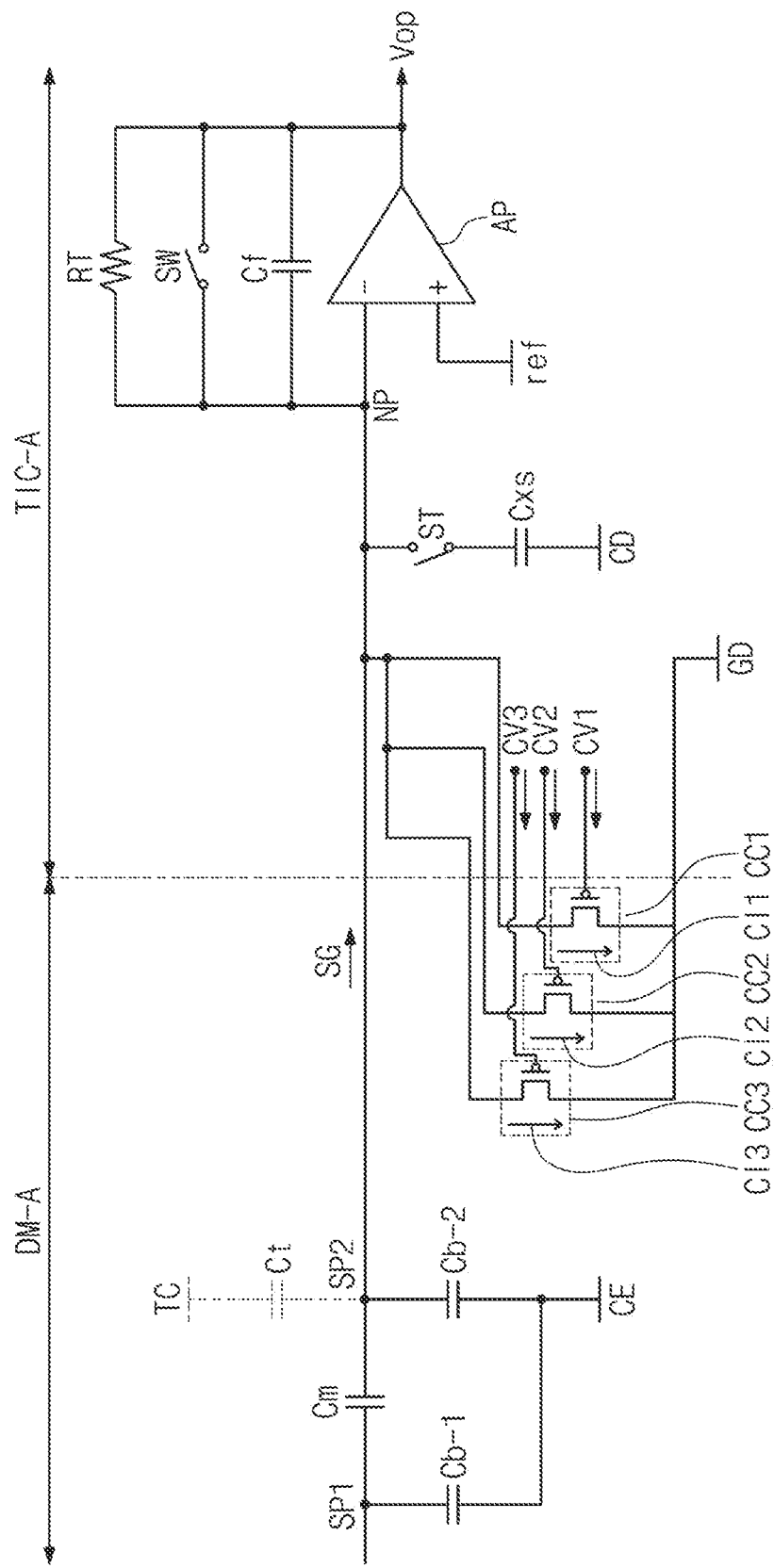
FIG. 12 illustrates a circuit diagram showing an electrical connection relationship between a detection control circuit and an input sensing layer according to some embodiments of the present invention.

FIG. 12 illustrates a circuit diagram showing an electrical connection relationship between a detection control circuit and an input sensing layer according to some embodiments of the present invention. In explaining FIG. 12, the same reference symbols are allocated to the components discussed in FIG. 11, and a repetitive description thereof will be omitted.

Referring to FIGS. 10 and 12, the display panel DP may include a plurality of constant-current circuits CC1, CC2, and CC3. The plurality of constant-current circuits CC1, CC2, and CC3 may be located in the inside DM-A of the display module DM. The plurality of constant-current circuits CC1, CC2, and CC3 may be located on the display panel DP, and thus the detection control circuit TIC may decrease in size. The circuit board 300 may decrease in size, and the bezel area BZA of the display device DD may decrease in size (see FIG. 1).

The plurality of constant-current circuits CC1, CC2, and CC3 may include a first constant-current circuit CC1, a second constant-current circuit CC2, and a third constant-current circuit CC3. FIG. 12 depicts by way of example three constant-current circuits CC1, CC2, and CC3, but no limitation is imposed on the number of the plurality of constant-current circuits according to some embodiments of the present invention.

The first constant-current circuit CC1 may include a first transistor including a first gate, a first source, and a first drain. The second constant-current circuit CC2 may include a second transistor including a second gate, a second source, and a second drain. The third constant-current circuit CC3 may include a third transistor including a third gate, a third source, and a third drain.

The first, second, and third gates may be correspondingly electrically connected to a plurality of terminals of the detection control circuit TIC, thereby being electrically connected to the control signal part CS.

The control signal part CS may use first, second, and third control voltages CV1, CV2, and CV3 to control on-off's of the first, second, and third transistors, respectively.

The control signal part CS may provide the first gate with the first control voltage CV1. A first current CI1 may flow through the first constant-current circuit CC1 in an on-state thereof. The first constant-current circuit CC1 may be configured such that the first current CI1 is used to provide the ground electrode GD with at least a portion of charge associated with the signal SG. The first constant-current circuit CC1 may remove at least a portion of capacitance of each of the parasitic capacitors Cb-1 and Cb-2, which capacitance is included in the signal SG.

The control signal part CS may provide the second gate with the second control voltage CV2. A second current CI2 may flow through the second constant-current circuit CC2 in an on-state thereof. The second constant-current circuit CC2 may be configured such that the second current CI2 is used to provide the ground electrode GD with at least a portion of charge associated with the signal SG. The second constant-current circuit CC2 may remove at least a portion of capacitance of each of the parasitic capacitors Cb-1 and Cb-2, which capacitance is included in the signal SG.

The control signal part CS may provide the third gate with the third control voltage CV3. A third current CI3 may flow through the third constant-current circuit CC3 in an on-state thereof. The third constant-current circuit CC3 may be configured such that the third current CI3 is used to provide the ground electrode GD with at least a portion of charge associated with the signal SG. The third constant-current circuit CC3 may remove at least a portion of capacitance of each of the parasitic capacitors Cb-1 and Cb-2, which capacitance is included in the signal SG.

The first, second, and third transistors may have their actives (see AC of FIG. 3C) whose widths are different from each other. For example, the first, second, and third currents CI1, CI2, and CI3 may have their intensities that are different from each other. There may be a difference in quantity between signal components caused by the capacitance of each of the parasitic capacitors Cb-1 and Cb-2, which signal components are removed by the first, second, and third constant-current circuits CC1, CC2, and CC3.

The detection control circuit TIC may use the first, second, and third control voltages CV1, CV2, and CV3 to selectively control operations of the first, second, and third constant-current circuits CC1, CC2, and CC3.

According to some embodiments of the present invention, based on magnitude of each of the parasitic capacitors Cb-1 and Cb-2, the detection control circuit TIC may select one or more of the first, second, and third constant-current circuits CC1, CC2, and CC3 to remove at least a portion of a component caused by the capacitance of each of the parasitic capacitors Cb-1 and Cb-2 from the signal SG sensed by the sensing electrode SP. The first, second, and third constant-current circuits CC1, CC2, and CC3 may reduce a reference value of the signal SG sensed by the sensing electrode SP. There may be an increase in ratio of a component resulting from a variation in capacitance of the sensing capacitor Ct to a reference value of a signal that is input to the output node NP. The detection control circuit TIC may easily detect the variation in the capacitance of the sensing capacitor Ct. It may be possible to improve reliability of the occurrence and position of touch by the external input TC. Accordingly, the display device (see DD of FIG. 1) may have an increased touch performance.

The first, second, and third sources may receive the signal SG through the second terminal (see TM2 of FIG. 3A).

The first, second, and third drains may be electrically connected through the third terminal (see TM3 of FIG. 3A) to the ground electrode GD.

According to some embodiments of the present invention, a parasitic capacitor between a display panel and a sensing electrode may have its capacitance that corresponds to that of a sensing capacitor between an external input and the sensing electrode. A detection control circuit according to some embodiments of the present invention may be configured such that an offset capacitor formed by a compensation electrode is used to reduce the capacitance of the parasitic capacitor.

An input sensing layer may include the sensing electrode and the compensation electrode that forms the offset capacitor. Accordingly, when the capacitance of the parasitic capacitor is changed due to a variation in temperature inside/outside of a display module, the capacitance of the offset capacitor may also be changed in correspondence to the change in capacitance of the parasitic capacitor, which may result in an improvement in quality of signals sensed through an output node.

According to some embodiments of the present invention, the detection control circuit may determine the occurrence of touch, based on a variation in the capacitance of the sensing capacitor provided between the sensing electrode and the external input. The detection control circuit may be configured such that a constant-current circuit located on the display panel is controlled to remove at least a portion of a component caused by the capacitance of the parasitic capacitor from a signal provided from the input sensing layer. There may be an increased ratio of signal variation between after and before touch. The detection control circuit may easily detect the variation in the capacitance of the sensing capacitor. It may be possible to improve reliability of the occurrence and position of touch by the external input. Accordingly, the display device may have an increased touch performance.

Moreover, according to some embodiments of the present invention, the constant-current circuit may be located in an inside of the display module. The constant-current circuit may be located on the display panel, and thus the detection control circuit may decrease in size. A circuit board may decrease in size, and a bezel area of the display device may decrease in size.

Aspects of some embodiments have been described in the specification and drawings. Although specific terms are used herein, they are merely used for the purpose of describing the present invention rather than limiting technical meanings or scopes of the present invention disclosed in the claims. Therefore, it will be appreciated by a person of ordinary skill in the art that various modifications and equivalent embodiments can be made from the present invention. In conclusion, the authentic technical scope of the present invention to be protected shall be determined by the technical concepts of the accompanying claims, and their equivalents.

What is claimed is:

1. A display device, comprising:
a base substrate having an active area and a peripheral area adjacent to the active area;
a circuit element layer on the base substrate and including a constant-current circuit;
a display element layer on the circuit element layer and including a driving electrode;
an input sensing layer on the display element layer and including a sensing electrode that overlaps the active area, the sensing electrode and the driving electrode forming a parasitic capacitor; and
a detection control circuit electrically connected to the sensing electrode and the constant-current circuit,
wherein the detection control circuit is configured to control the constant-current circuit to remove at least a portion of a component caused by capacitance of the parasitic capacitor from a signal that is input from the sensing electrode.

2. The display device of claim 1, wherein the constant-current circuit is on the peripheral area.

3. The display device of claim 1, wherein
the constant-current circuit includes a first transistor including a first gate, a first source, and a first drain, and
the detection control circuit includes a first terminal electrically connected to the first gate, a second terminal electrically connected to the first source, and a third terminal electrically connected to the first drain.

4. The display device of claim 3, wherein the second terminal is configured to provide the constant-current circuit with the signal.

5. The display device of claim 3, wherein the detection control circuit is configured to provide the first terminal with a control voltage to control on-off of the first transistor.

6. The display device of claim 5, wherein the control voltage is provided in a pulse width modulation manner.

7. The display device of claim 3, wherein
the detection control circuit further includes a ground electrode, and
the third terminal is electrically connected to the ground electrode.

8. The display device of claim 3, wherein
the display element layer further includes a power line to which a power voltage is provided, and
the third terminal is electrically connected to the power line.

9. The display device of claim 3, wherein
the constant-current circuit further includes a second transistor including a second gate, a second source, and a second drain, and
the detection control circuit further includes a fourth terminal electrically connected to the second gate.

10. The display device of claim 9, wherein
the second source is electrically connected to the second terminal, and
the second drain is electrically connected to the third terminal.

11. The display device of claim 9, wherein the detection control circuit is configured to provide the fourth terminal with a control voltage to control on-off of the second transistor.

* * * * *